United States Patent
Sobchak et al.

(10) Patent No.: US 8,238,860 B2
(45) Date of Patent: Aug. 7, 2012

(54) TUNING A SECOND ORDER INTERCEPT POINT OF A MIXER IN A RECEIVER

(75) Inventors: Charles LeRoy Sobchak, Davie, FL (US); Mahibur Rahman, Chandler, AZ (US); Manish N. Shah, Vernon Hills, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 1233 days.

(21) Appl. No.: 12/018,354

(22) Filed: Jan. 23, 2008

(65) Prior Publication Data

US 2009/0186587 A1 Jul. 23, 2009

(51) Int. Cl.
*H04B 17/00* (2006.01)
(52) U.S. Cl. ............... 455/226.2; 455/226.1; 455/250.1; 375/345
(58) Field of Classification Search ............... 455/226.1, 455/226.2, 250.1; 375/345
See application file for complete search history.

(56) References Cited

U.S. PATENT DOCUMENTS

| | | | | |
|---|---|---|---|---|
| 5,257,286 A * | 10/1993 | Ray | ............... | 375/230 |
| 6,426,983 B1 * | 7/2002 | Rakib et al. | ............... | 375/346 |
| 6,992,519 B2 | 1/2006 | Vilander et al. | | |
| 7,113,758 B2 * | 9/2006 | Kishi | ............... | 455/234.1 |
| 7,116,955 B2 * | 10/2006 | Schaffer et al. | ............ | 455/234.1 |
| 7,197,291 B2 | 3/2007 | Mach et al. | | |
| 7,299,021 B2 * | 11/2007 | Pärssinen et al. | .......... | 455/226.1 |
| 7,446,878 B2 * | 11/2008 | Ridder et al. | ................ | 356/451 |
| 7,522,658 B2 * | 4/2009 | Jensen | ........................ | 375/219 |
| 2001/0019584 A1 * | 9/2001 | Azazzi et al. | ................. | 375/233 |
| 2003/0124999 A1 * | 7/2003 | Parssinen et al. | .......... | 455/226.1 |
| 2004/0088343 A1 * | 5/2004 | Cannon | .................... | 708/306 |
| 2004/0185810 A1 * | 9/2004 | Kishi | .................... | 455/127.2 |
| 2004/0247042 A1 * | 12/2004 | Sahlman | .................... | 375/297 |
| 2005/0100105 A1 * | 5/2005 | Jensen | .................... | 375/259 |
| 2005/0249365 A1 * | 11/2005 | Ishii | .................... | 381/119 |
| 2006/0019627 A1 * | 1/2006 | Talbot | ................ | 455/296 |
| 2006/0094386 A1 | 5/2006 | Darabi et al. | | |
| 2006/0094387 A1 | 5/2006 | Darabi | | |
| 2006/0222116 A1 * | 10/2006 | Hughes et al. | ................ | 375/345 |
| 2007/0008945 A1 | 1/2007 | Son et al. | | |
| 2011/0128992 A1 * | 6/2011 | Maeda et al. | ................ | 375/130 |

OTHER PUBLICATIONS

Walid Y. Ali-Ahmad, "Effective IM2 estimation for two-tone and WCDMA modulated blockers in zero-IF", www.rfdesign.com, Apr. 2004, pp. 32, 34, 36, and 38.

* cited by examiner

*Primary Examiner* — Temesgh Ghebretinsae
*Assistant Examiner* — Richard Chan

(57) ABSTRACT

An IP2 tuning circuit (404, 1004, 1104 and 1404) for tuning the IP2 of a mixer (414 and 415) to minimize second order intermodulation distortion (IMD2) in a receiver (402, 1002, 1102 and 1402) of a transceiver (401, 1001, 1101 and 1401). An operating characteristic of the mixer related to IMD2 is changeable by changing a value of a setting of the mixer. Two tones outside a bandpass of the receiver are injected into the mixer and a calibration tone within the bandpass is produced as a result of IMD2. Alternatively, a DSSS signal is injected into the mixer and the calibration tone is produced at a chip rate of the DSSS signal. The power of the calibration tone is measured at a plurality of values of the settings. Alternatively, a four-level PN DSSS signal of known content is injected into the mixer, and a two-level PN DSSS signal of known content produced therefrom is correlated with a two-level PN DSSS signal of known content produced by a squaring circuit (1468).

10 Claims, 16 Drawing Sheets

TUNING A SECOND ORDER INTERCEPT POINT OF A MIXER IN A RECEIVER

BACKGROUND OF THE INVENTION

1. Field of the Invention

This invention relates generally to radio frequency receivers, and more specifically to reducing second order intermodulation distortion in a direct conversion receiver.

2. Related Art

A receiver uses the frequency response of a low noise amplifier (LNA), a surface acoustic wave (SAW) filter and a duplexer to attenuate signals that are far from a center frequency of the receiver sufficiently enough to not corrupt a desired signal. If the LNA and the SAW filter are removed from the analog line-up of the receiver, problems that can detrimentally affect the performance of the receiver may arise. In a transceiver, which comprises a transmitter and a receiver, one such problem is a signal transmitted by the transmitter leaking into a receive path of the receiver. In a receiver with only a duplexer to isolate the receiver from the transmitter, there is considerably less attenuation at the transmitted frequency. A receiver that lacks an LNA and a SAW filter requires additional and/or tighter constraints on at least some of the non-idealities in the analog line-up of the receiver. One example on which a tighter constraint is necessary is the second order intercept point (IP2) of the mixer. Without a sufficiently high IP2 of the mixer, the presence of second order intermodulation distortion (IMD2) substantially reduces the sensitivity of the receiver.

Most cellular wireless transceivers use a direct-conversion receiver because a high level of integration can be obtained. However, a direct-conversion receiver requires a high input-related second order intercept point (IIP2), which is the theoretical input level at which the power of the IMD2 products are equal in power to the power of a desired signal. FIG. 1 shows a simplified functional block diagram of a portion of a typical known direct-conversion, third-generation (3G) receiver 102 that lacks both an LNA and a SAW filter. The receiver 102 may be part of a transceiver 101 that includes a transmitter 103. The receiver 102 comprises a transconductance amplifier (TCA) 110 that amplifies a received signal, and a local oscillator 112. The TCA 110 is coupled to an antenna 106 via a duplexer 108. If the receiver 102 had included an LNA and a SAW filter, they would have been typically present in the analog line-up between the duplexer 108 and the TCA 110. Next, an in-phase (I-phase) mixer 114 and a quadrature-phase (Q-phase) mixer 115 are employed to convert the RF signal to a zero-IF, or baseband, signal. The mixers 114 and 115 are driven by the local oscillator 112. The frequency of the local oscillator 112 is controlled by a 3G receiver RF phase locked loop 116 that is coupled to a divide-by-two circuit 117. One output of the local oscillator 112 is phase shifted by 90° to provide an I-phase component and a Q-phase component of the received signal. The output of each mixer 114 and 115 is coupled to a biquad filter 118 and 119. The biquad filters 118 and 119 attenuate higher frequency signals. Each biquad filter 118 and 119 is coupled to a baseband amplifier 122 and 123. The output of each baseband amplifier 122 and 123 is coupled to an analog lowpass filter 124 and 125. The analog lowpass baseband filters 124 and 125 attenuate adjacent channel blockers and attenuates higher frequencies. The output of each lowpass filter 124 and 125 is coupled to a sigma-delta analog-to-digital (A/D) converter 130 and 131. The output of the A/D converters 130 and 131 provides I samples and Q samples, respectively, to decimation filters 140 and 141 for further processing by the receiver 102.

In the receiver 102, transmitted signals are attenuated via the duplexer 108 by approximately 50 dB; nevertheless, attenuated transmitted signals leak into the receive signal path prior to the TCA 110. For example, in the receiver 102, the duplexer 108 attenuates a strong transmitted signal of +25 dBm (316 milliwatts) located at 190 MHz from the center frequency by only 50 dB, thus resulting in a signal of −25 dBm (3.16 μwatts) at the input of the TCA 110. This −25 dBm signal creates strong IMD2 products that land on the desired signal, thus producing co-channel interference. Without a sufficiently high IP2, the IMD2 can greatly detrimentally affect the sensitivity of the receiver 102.

FIG. 2 shows an example of how the IP2 of the mixer 114 and 115 in the receiver 102 can vary due to one or more factors. FIG. 2 is an idealized graph showing how the IP2 of the mixer 144 and 115 can vary due to manufacturing processes and/or change in temperature. Any mismatch between differential signals I+ and I− in mixer 114 causes a reduction in the IP2 from the optimal IP2 (located at the center point of the graph of IP2). When I+ and I− are not matched, due to variations in manufacturing processes or due to temperature changes during operation of the receiver 102, or due to both causes, there is a worse IP2. The mismatch can also occur due to direct current (DC) offset, local oscillator leakage, or other factors. As shown in FIG. 2, when there is a large mismatch between I+ and I−, a worst case IP2 is approximately 25 dBm is produced. The following example uses the worst case IP2 of 25 dBm from measured data of a known 3G receiver, such as the receiver 102.

$$IMD2 = P_{in} - (IP_2 - (P_{in})) = -25 - (25 - (-25)) = -75 \text{ dBm} = 3.16 \text{ μwatts}$$

When a transmit signal is at maximum power, 25 dBm, the IMD2 referred to the input of the transconductance amplifier (TCA) in FIG. 1, is −75 dBm. The received power spectral density, Ior, as per the 3rd Generation Partnership Project (3GPP) sensitivity specification, should be at or below −106.7 dBm to achieve a 0.1% bit error rate. The thermal noise, kTBF, in this example is approximately −99 dBm. Because the power of the IMD2 over the bandwidth of the desired signal is much greater than the kTBF, the sensitivity rises to −82.7 dB, i.e., 24 dB above the required sensitivity. The receiver 102, including, in particular, a direct-conversion receiver that lacks a SAW, should have a sufficiently large IP2 to meet the 3GPP specifications.

The IMD2 results from squaring the transmitted signal at the input to the mixer 114 and 115; therefore, without careful control of the IP2 of the mixer 114 and 115, the IMD2 could dominate the sensitivity of the receiver 102. FIG. 3 is a graph of the power of the Ior and the power of the IMD2, versus frequency, at the input of the A/D converter 130 in the receiver 102 when there is a large mismatch between I+ and I− that produces a relatively low IP2 of approximately 25 dBm. The top portion of FIG. 3 shows the power of the IMD2 from zero to 6 MHz. The bottom portion shows the power of the Ior. FIG. 3 graphically shows a relatively high IMD2 disadvantageously dominating the sensitivity of the receiver 102.

Most known methods for increasing the IP2 of a mixer in a direct-conversion receiver involve improving the selectivity of the analog line-up of the receiver. Other known methods for increasing the IP2 in a direct-conversion receiver use multiple receivers, or use a circuit that estimates the DC offset of the mixer, to improve the IP2.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION OF THE EXEMPLARY EMBODIMENT

Figure 4:
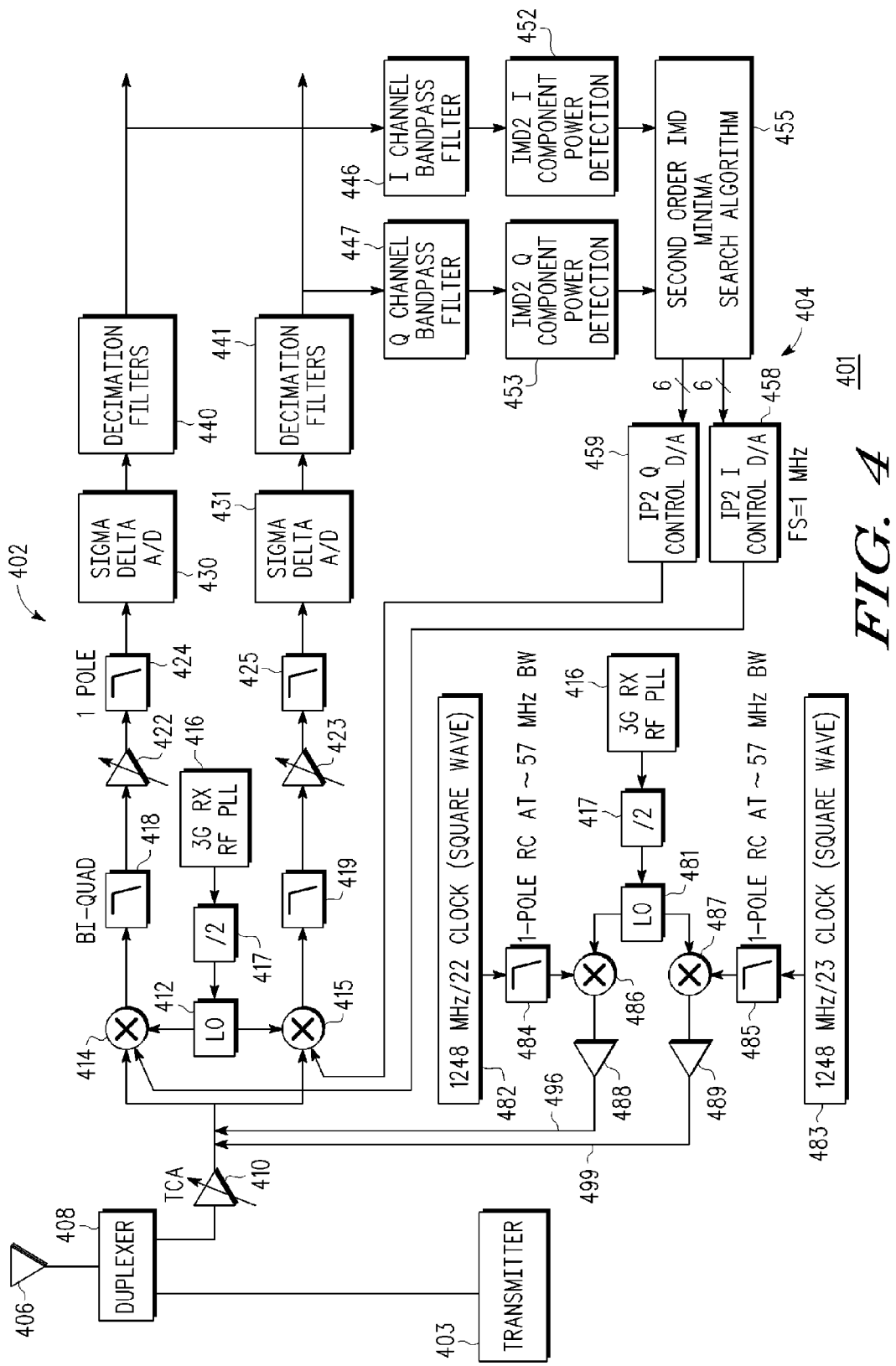
FIG. 4 is a simplified functional block diagram of a direct-conversion receiver including mixers, in accordance with an exemplary embodiment of the invention, including mixers, an analog-to-digital converter, and an estimation circuit.

FIG. 4 is a simplified functional block diagram of a portion of a direct-conversion receiver 402 that includes an embodiment of an IP2 tuning circuit 404 in accordance with the invention. The IP2 tuning circuit 404 is used in conjunction with a two-tone method that is more fully explained hereinbelow. The receiver 402 comprises a transconductance amplifier (TCA) 410 that amplifies a received signal, and a local oscillator 412. The TCA 410 is coupled to an antenna 406 via a duplexer 408. If the receiver 402 had included an LNA and a SAW filter, they would have been typically located in the analog line-up between the duplexer 408 and the TCA 410. Next, an in-phase (I-phase) mixer 414 and a quadrature-phase (Q-phase) mixer 415 are employed to convert an RF signal to a zero-IF signal. The mixers 414 and 415 are driven by the local oscillator 412. The frequency of the local oscillator 412 is controlled by a 3G receiver RF phase locked loop (PLL) 416 that is coupled to a divide-by-two circuit 417. One output of the local oscillator 412 is phase shifted by 90° so that the local oscillator provides an I-phase component and a Q-phase component of the received signal. The output of each mixer 414 and 415 is coupled to a biquad filter 418 and 419 via an amplifier (not shown). The biquad filters 418 and 419 attenuate higher frequency signals. Each biquad filter 418 and 419 is coupled to a baseband amplifier 422 and 423. The output of each baseband amplifier 422 and 423 is coupled to an analog lowpass baseband filter 424 and 425. The baseband filter 424 and 425 attenuates higher frequencies including adjacent channel blockers. The output of each baseband filter 424 and 425 is coupled to a sigma-delta analog-to-digital (A/D) converter 430 and 431 via another amplifier (not shown). The output of each A/D converter 430 and 431 provides I samples and Q samples, respectively, to decimation filters 440 and 441 for further processing by the receiver 402. The receiver 402 includes other components and circuits that are not shown in the drawings, including an automatic gain control (AGC) circuit, a coarse DC offset correction (DCOC) circuit, and a fine DCOC circuit. It should be noted that the receiver 402 could be part of a transceiver 401 that includes a transmitter 403; however, the transmitter is not modified to accommodate the IP2 tuning circuit 404 of the receiver. The transmitter 403 is coupled to the duplexer 408, which can leak transmitted signals into the receiver 402.

The output of each A/D converter 430 and 431 also provides I samples and Q samples, respectively, to the IP2 tuning circuit 404. The IP2 tuning circuit 404 includes bandpass filters 446 and 447, which receive the output from the A/D converters 430 and 431, respectively. In the embodiment shown in FIG. 4, the bandpass filter 446 and 447 has a center frequency of 2.466 MHz. The output from each bandpass filter 446 and 447 is coupled to the input of an I-component power detection circuit 452 and a Q-component power detection circuit 453 (hereinafter "estimation circuits"). The output from the estimation circuits 452 and 453 are coupled to a search algorithm circuit 455, which may alternatively be implemented in software controlled by a processor (not shown). In the embodiment shown in FIG. 4, the search algorithm circuit 455 outputs a six-bit digital signal for the I-channel and a six-bit digital signal for the Q-channel. Each six-bit digital signal from the search algorithm circuit 455 is fed into a respective IP2 control digital-to-analog converter (DAC) 458 and 459. In the embodiment shown in FIG. 4, each IP2 control DAC 458 and 459 has a sampling frequency of 1 MHz. An analog output signal from each IP2 control DAC 458 and 459 is coupled to respective mixers 414 and 415 to control an operating parameter thereof. In one embodiment, a mixer comprises two transistors (not shown). The value of the analog output signal (hereinafter "DAC setting") from each IP2 control DAC 458 and 459 controls the operation of the respective mixer 414 and 415 by changing the DC bias in the base of the transistors of the respective mixer, which, in turn, affects the IP2 of the respective mixer. It should be understood that the single signal paths shown between most of the functional blocks in FIG. 4, represent a pair of differential signal paths. For example, the single signal path for the I-channel represents two differential signal paths, one path for differential signal I+ and one path for differential signal I−. When differential signals I+ and I− are not matched, a DC voltage is added, in steps, to the DC bias in the base of at least one transistor of the mixer 414 to cause I+ and I− to become more closely matched. When differential signals Q+ and Q− are not matched, a DC voltage is added, in steps, to the DC bias in the base of at least one transistor of the mixer 415 to cause Q+ and Q− to become more closely matched. In one embodiment that has an 8-bit IP2 control DAC 458 and 459, a step size is approximately 100 μV and a voltage range of the analog output signal from each IP2 control DAC is approximately ±12.8 mV. In another embodiment that has a 6-bit IP2 control DAC, a step size is approximately 400 μV and a voltage range of the analog output signal from each IP2 control DAC is approximately ±12.8 mV.

Using a 1248 MHz reference clock (not shown) of the transceiver 401, a sub-circuit of the IP2 tuning circuit 404 generates two instrument signals. The sub-circuit includes a first input signal 482, a square wave at 56.72 MHz, which is the frequency of the reference clock divided by twenty-two (22), and a second input signal 483, a square wave at 54.26 MHz, which is the frequency of the reference clock divided by twenty-three (23). The sub-circuit includes one-pole RC filters 484 and 485 that have a bandwidth of approximately 57 MHz, translational mixers 486 and 487, and a local oscillator 481 whose operation is controlled by the receiver PLL 416 and by the divide-by-two circuit 417. Two output signals from the RC filters 484 and 485 are up-mixed using the mixers 486 and 487 to generate the instrument signals. In FIG. 4, the local oscillator 481 is coupled to the receiver PLL 416. Alternately, the local oscillator 481 is coupled to another PLL (not shown) instead of to the receiver PLL 416. The output from the mixers 486 and 487 is coupled to tone level amplifiers 488 and 489, to generate instrument signals at a different offset frequency from a desired receive signal. The output of the sub-circuit comprises two instrument signals 622 and 623 (see FIG. 6). One instrument signal 622 is located at 56.72 MHz, and the other instrument signal 623 is located at 54.26 MHz. In one embodiment, the instrument signals are generated such that the instrument signals are at a fixed offset from a desired receive frequency. In another embodiment, the instrument signals are sinusoids of preselected frequencies created by digital signal processing in the transmitter.

The instrument signals 622 and 623 are injected into the mixers 414 and 415 and used to create the IMD2 that resides at 2.466 MHz, which is the difference between 56.72 MHz and 54.26 MHz. The IMD2 at 2.466 MHz is used as the calibration signal 610 to tune the IP2 of the mixer. The analog lineup of the receiver provides sufficient attenuation of the instrument signals (at 56.72 MHz and 54.26 MHz) and minimal attenuation of the calibration signal 610. The instrument signals 622 and 623 are filtered off by the analog lineup, whereas the calibration signal 610 is passed through the analog lineup and through the A/D converter 430 and 431. The power of the calibration signal 610 is estimated, and a search algorithm finds which DAC setting corresponds to the minimum IMD2; hence, the largest IP2.

The removal of the LNA and SAW from the analog line-up of the receiver 102 makes it desirable to have better control of the IP2 of the mixer 414 and 415. With the IP2 tuning circuit 404, the IP2 of the mixer 414 and 415 is controlled by injecting the instrument signals 622 and 623 into the mixers 414 and 415, from which is produced IMD2 by the nonlinearities of the mixers. A component of the IMD2 so produced that is of particular usefulness is the component whose frequency is the difference between the frequencies of the instrument signals 622 and 623. This component of the IMD2 functions as a calibration signal 610 (see FIG. 6) under with the receiver 402. The calibration signal 610 is used to tune the IP2 of the mixer 414 and 415, thus minimizing the effect of the IMD2 on the receiver 402. The IP2 of the mixer 414 and 415 is re-tuned by injecting the instrument signals into the mixer either periodically, a periodically, or upon occurrence of preselected conditions, states or events. For example, the IP2 of the mixer is re-tuned upon occurrence of a reduction in sensitivity of the receiver 402 more than a predetermined amount. For example, the IP2 of the mixer is re-tuned upon occurrence of an increase in a bit error rate (BER) of the receiver 402 more than a predetermined amount.

The IP2 tuning circuit 404 tunes the mixer 414 and 415 to its highest IP2, thereby ensuring that the impact of the IMD2 is minimized. The IP2 tuning circuit 404 overcomes a second order non-linearity problem that arises with a receiver that lacks a SAW filter or that lacks both a SAW filter and an LNA, such as the receiver 402.

The IP2 tuning circuit 404 is used for dynamically updating the IP2 during normal receive operation. The method in accordance with the invention injects instrument signals into the mixers 414 and 415 during normal receive operation to tune the IP2 of the mixers. The I-phase mixer 414 and the Q-phase mixer 415 are tuned to their maximum IP2 so that their IMD2 does not limit the sensitivity of the receiver 402. The I-phase mixer 414 and the Q-phase mixer 415 are separately and individually tuned to their maximum IP2. The IP2 of the mixers 414 and 415 needs to be tuned to a minimum selectivity of 58 dBm for a desired sensitivity margin of 1 dB under worst case conditions of the analog lineup. This is achieved by using two tones as instrument signals that are input injected into the mixers 414 and 415 via direct connections 496 and 499 (see FIG. 4), or alternatively are transmitted in the transmit path of the transceiver (see FIG. 10). The instrument signals create IMD2 that is used to calibrate the IP2 control DAC 458 and 459 that are coupled to mixer 414 and 415, respectively, in order to maximize the IP2. The power of the calibration signal (i.e., the IMD2 created by the two input tones) is estimated by an estimation circuit 452 and 453, and the DAC setting is adjusted until the IMD2 is minimized A minimal IMD2 results in a largest mixer IP2.

The IP2 tuning circuit 404 and the two-tone method used in conjunction therewith are also used to tune the IP2 of the mixer 414 and 415 during a cold start when no desired signal is being received.

To minimize impact on the sensitivity of the receiver 402, the IP2 tuning circuit 404 tunes the IP2 such that the IMD2 is at least 10 dB below the kTBF (i.e., −99−10=−109 dBm).

$$IP2=2P_{in}IMD2=-50-(-109)=59 \text{ dBm}$$

If the IMD2 (referred to the antenna) is desired to be at or below −109 dBm, which, in this example, has little impact on the sensitivity of the receiver 402, it is necessary that the IP2 of the mixer 414 and 415 be greater than 59 dBm. The IP2 tuning circuit 404 is able to tune the IP2 of the mixer 414 and 415 to a value greater than 59 dBm.

The estimation circuit 452 and 453 is used with a variable center frequency and bandwidth to create a bandpass filter centered at 2.466 MHz. The estimation circuit 452 and 453 ensures that the signal-to-noise ratio of the calibration signal 610 is maximized, thus more accurately measuring the power of the calibration signal. The power estimated by the estimation circuit 452 and 453 is used to dynamically tune the IP2 until a minimum power (a minimum signal-to-noise ratio) at 2.466 MHz is achieved.

The methods in accordance with the invention are intended for use in a typical 3G receiver that has minimum analog selectivity and that has a majority of blocker and adjacent channel selectivity occurring in the digital domain. Therefore, the analog line-up of the receiver 402 does not provide too much selectivity to the calibration signal 610. In addition, the instrument signals 622 and 623 should be sufficiently far from the receive frequency so that they are attenuated and do not impact the signal-to-noise ratio (SNR) of the A/D converter 430 and of the receiver 402. So that the method can run during normal receive operation, the instrument signals 622 and 623 are sufficiently attenuated at the input to the A/D converter 430 to not affect the SNR and to not cause the AGC to switch gain states.

Figure 5:
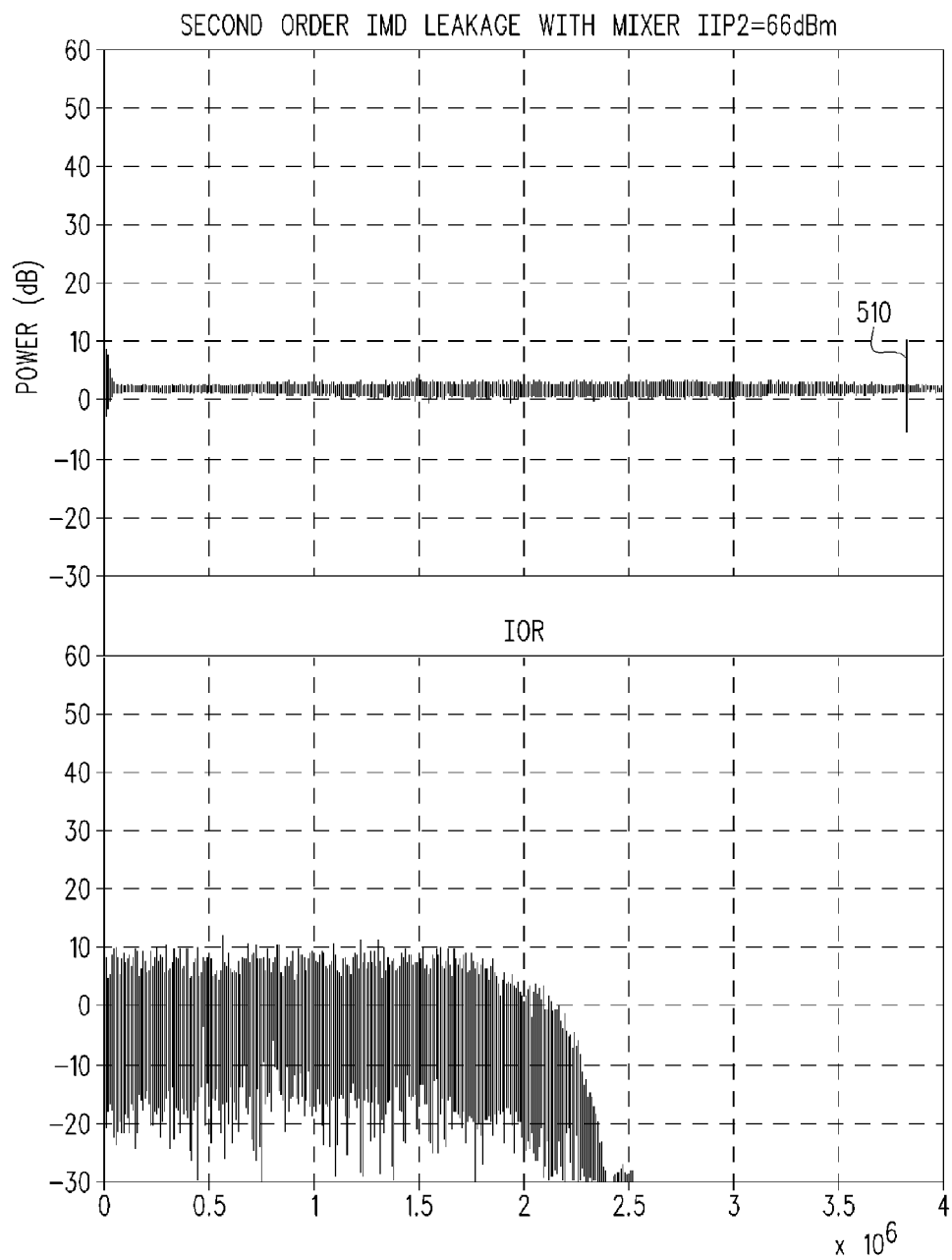
FIG. 5 is a graph of the or and the IMD2, versus frequency, at the input of the analog-to-digital converter in the direct-conversion receiver of FIG. 4.

FIG. 5 is a graph of the power of the Ior and the power of the IMD2, versus frequency, at the input of the analog-to-digital converter 430 and 431 in the receiver 402, when the IP2 is at 66 dBm. The IP2 tuning circuit 404 and method in accordance with the invention can increase the IP2 of the mixer 414 and 415 of the receiver 402 to at least 66 dBm. The top portion of FIG. 5 shows the power of the IMD2 from zero to 4 MHz. The bottom portion shows the power of the Ior. FIG. 5 shows that the IMD2 from the transmitted signal is well below the Ior, thus having a minimal detrimental effect on the sensitivity of the receiver 402.

Figure 6:
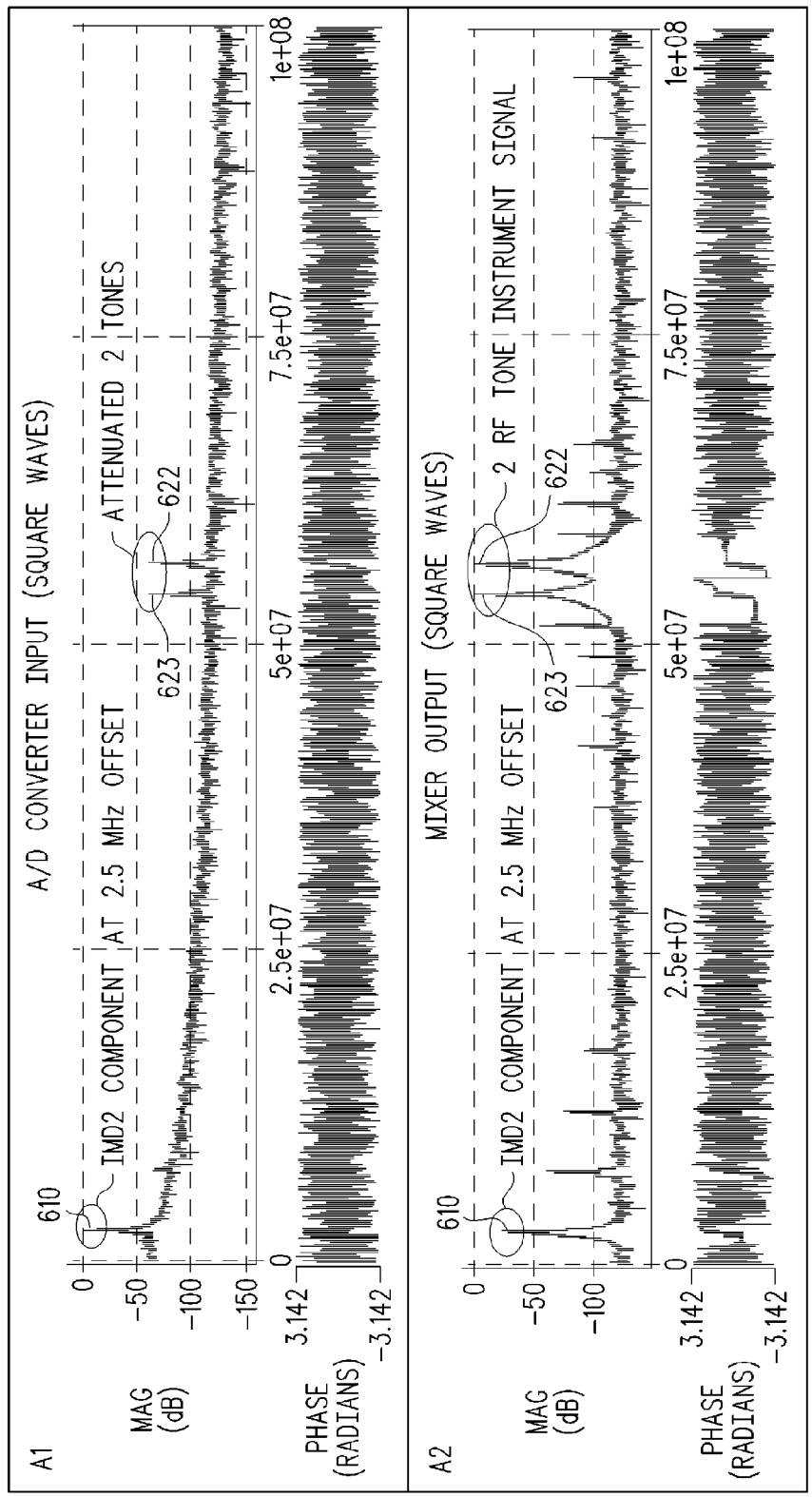
FIG. 6 are charts of the magnitude response of the direct-conversion receiver of FIG. 4 showing instrument signals and a calibration signal.

FIG. 6 (bottom portion) shows magnitude responses of instrument signals 622 and 623 and of the calibration signal 610, at the output of the mixer 414 and 415. FIG. 6 (top portion) shows magnitude responses of instrument signals 622 and 623 and of the calibration signal 610, at the input of the A/D converter 430 and 431. FIG. 6 shows that the magnitude responses of the instrument signals 622 and 623 at the input of the A/D converter 430 and 431 is less than the magnitude responses of the instrument signals at the output of the mixer 414 and 415, as a result of the analog line-up. On the other hand, FIG. 6 shows that the magnitude response of the calibration signal 610 at the input of the A/D converter 430 and 431 is greater than the magnitude response of the calibration signal at the output of the mixer 414 and 415. In one embodiment, the baseband filter 424 and 425 has greater than 15 dB attenuation at 50 MHz.

Figure 7:
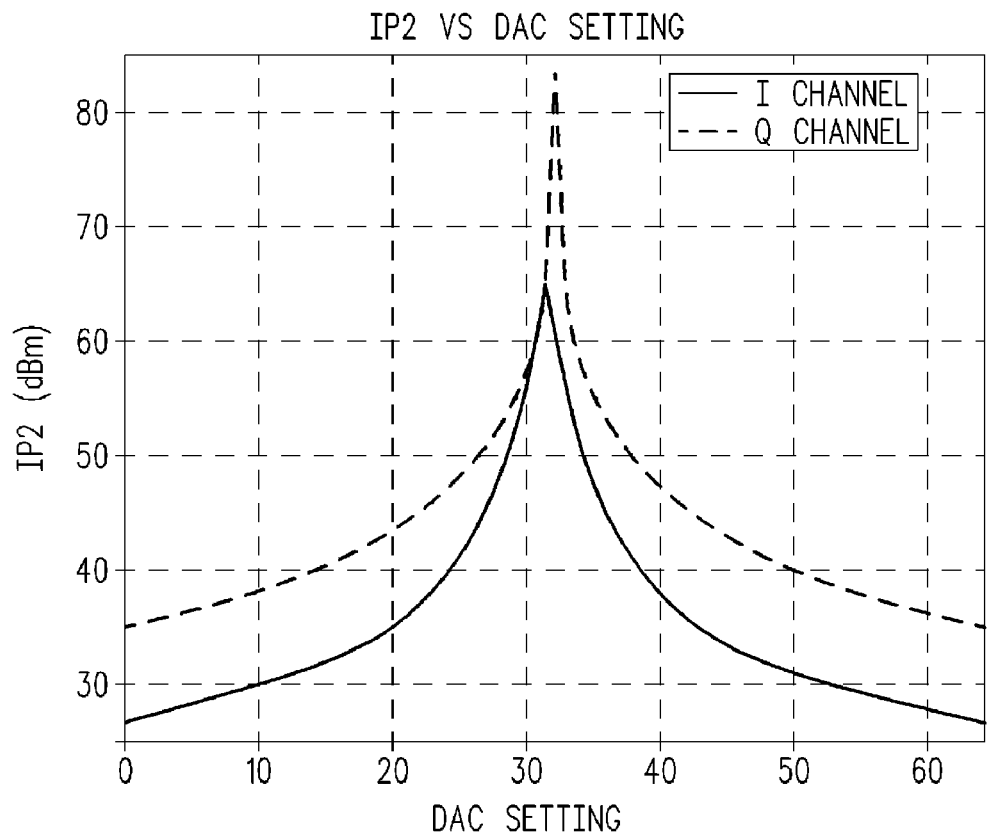
FIG. 7 is a graph of IP2 versus DAC settings for the mixers in the direct-conversion receiver of FIG. 4.

FIG. 7 shows an example of IP2 versus DAC setting for the mixer 414 and 415 for an embodiment of the IP2 tuning circuit 404 having sixty-four (64) settings. As can be seen from FIG. 7, the IP2 of the mixer can vary greatly, and, in addition, the optimal DAC setting for the I-channel is not necessarily the same as the DAC setting for the Q-channel. In the example shown in FIG. 7, the highest IP2 for the mixer 414 (I-channel) occurs at DAC setting "31", and the highest IP2 for the mixer 415 (Q-channel) occurs at DAC setting "32".

In an exemplary embodiment, the calibration signal 610 is located at 2.466 MHz, which is very close to the midpoint between channels that are spaced 5.000 MHz apart. In the exemplary embodiment, the instruments signals 622 and 623 are selected to be at 56.72 MHz and 54.26 MHz, respectively, because these frequencies are convenient to generate. However, other frequencies could be chosen for the instrument signals, so long as the chosen instrument signals produce a calibration signal within the bandwidth of the biquad filter 418 and 419 and baseband pole 424 and 425. When necessary to calibrate the receiver 402 during normal receive operation, the instrument signals are chosen to produce a calibration signal in the range of approximately 2.2 MHz and 2.8 MHz, because this range places the calibration signal 610 near the midpoint between the desired channel and an adjacent channel. In addition, the frequencies of the instrument signals 622 and 623 and the calibration signal 610 are selected so as to not cause gain setting changes in the AGC circuit of the receiver 402. The frequencies of the instrument signals 622 and 623 are chosen so that the IMD2 is strong enough to be measured, but not so strong that it causes a switch in a gain setting of the AGC circuit.

In an exemplary embodiment, the decimation filter 440 and 441 is a comb filter. Alternatively, the decimation filter 440 and 441 is another type of filter, such as a finite impulse response filter, a half-band filter or a third-band filter. The decimation filter down samples signals from 96 MHz to 16 MHz. The decimation filter 440 and 441 also attenuates signals beyond 5 MHz, such that there is a greater than 50 dB attenuation at 50 MHz. Therefore, at the output of the decimation filter, there is greater than 110 dB of attenuation of the frequencies of the instrument signals. However, at the output of the decimation filter, the IMD2 distortion at 2.466 MHz is only attenuated by 5-6 dB.

In an exemplary embodiment, the estimation circuit 452 and 453 comprises a Goertzel filter that is used to measure the power in a bandpass filter of narrow bandwidth. Alternatively, a fast Fournier transform filter or any bandpass filter measures the power. The following equation shows the transfer function of the infinite impulse response bandpass filter of the estimation circuit 452 and 453.

$$H[z] = \frac{(1 - (\rho\cos(\theta) - j\rho\sin(\theta))z^{-1})}{(1 - 2\rho\cos(\theta)z^{-1} + \rho^2 z^{-2})}$$

where $\rho$ is the magnitude of the signal and $\theta$ is the angle of the signal, using a polar coordinate system.

Figure 8:
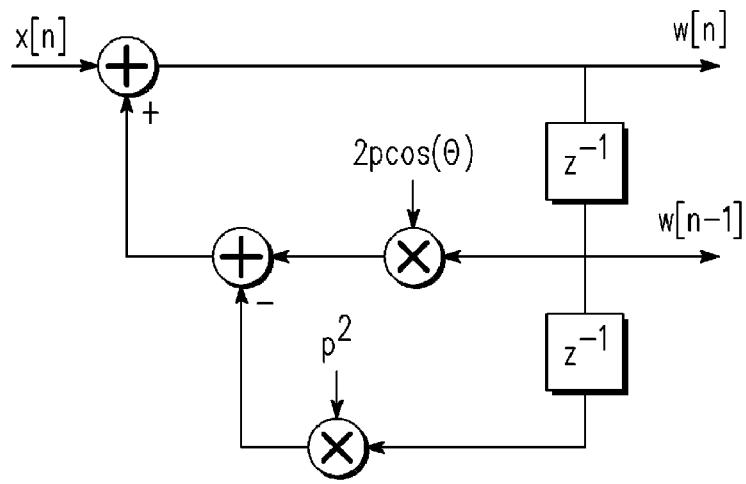
FIG. 8 is a functional block diagram of a bandpass IIR of the estimation circuit in the direct-conversion receiver of FIG. 4.

The estimation circuit 452 and 453 may comprise an infinite impulse response (IIR) bandpass filter. FIG. 8 is a functional block diagram of the IIR bandpass filter of the estimation circuit 452 and 453, wherein x(n) represent the output from the highpass filter 446 and 447, which becomes the input to the estimation circuit. The following equation describes the output of the estimation circuit.

$$|Y(f)|^2 = \omega(n)^2 + \omega(n+1)^2 - \omega(n)\omega(n-1)(2\rho\cos(\theta))$$

The estimation circuit 452 and 453 outputs an estimate of the IMD2. The center frequency of the bandpass filter of the estimation circuit 452 and 453 is adjustable for any frequency of the calibration signal. Depending upon the required signal-to-noise ratio (SNR) of the IMD2, to accurately measure the IMD2, the bandwidth of the bandpass filter is adjustable. For an exemplary embodiment, a 1 kHz bandwidth achieves sufficient SNR of the calibration signal to tune the IP2 to a value above 65 dBm. The estimation circuit 452 and 453 may comprise a discrete Fourier transform (DFT) bin, and the bandwidth of the bin and the power averaging times for the estimation circuit 452 and 453 are programmable.

Figure 9:
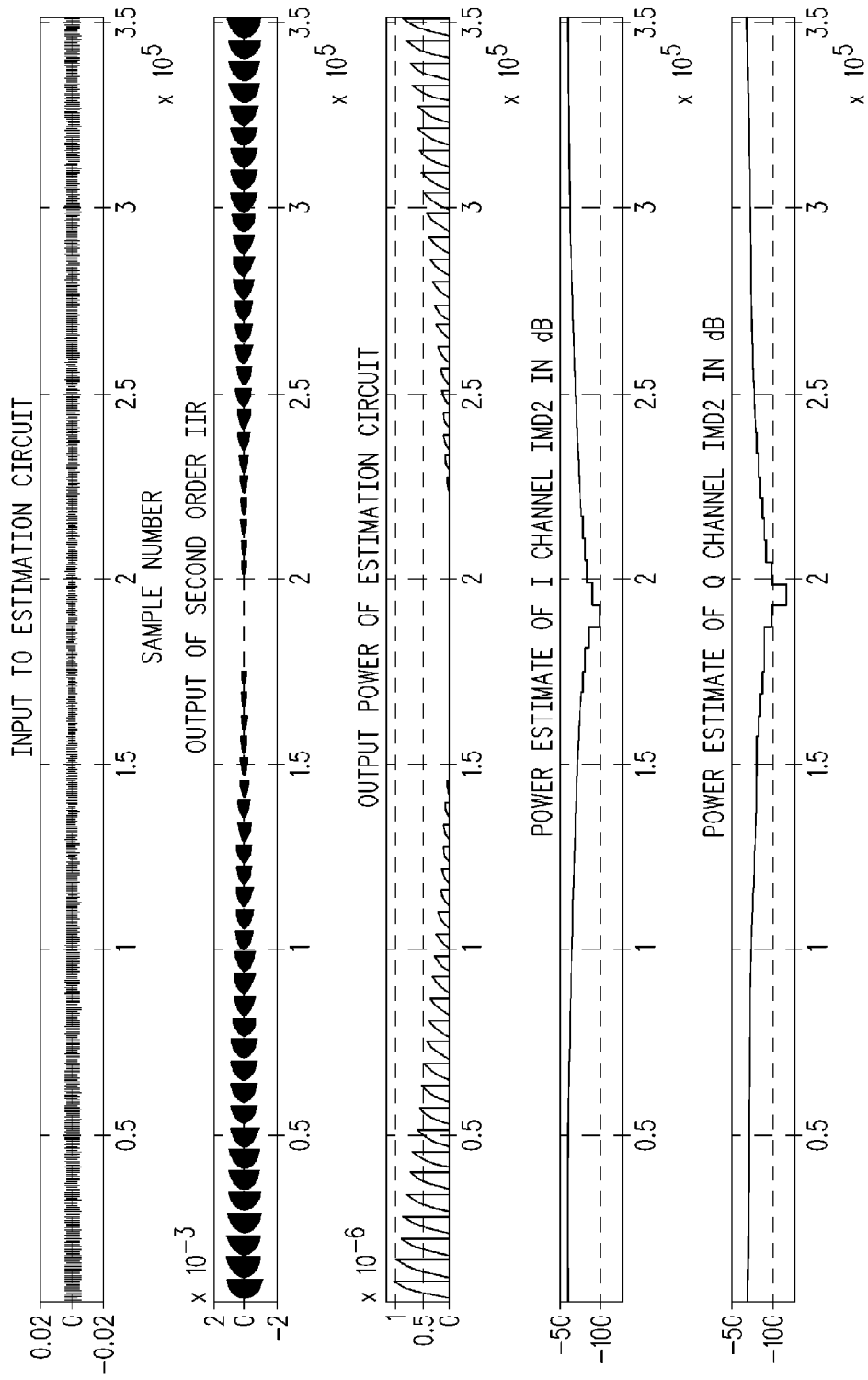
FIG. 9 are five plots of signals, which illustrate an example of tuning the IP2 of the direct-conversion receiver of FIG. 4.

FIG. 9 illustrates five plots of signals at various locations of the IP2 tuning circuit 404, which illustrate an example of using the two-tone method to tune the IP2 of the receiver 402, for an embodiment of the IP2 tuning circuit having sixty-four (64) DAC settings. In FIG. 9, the horizontal axis represents samples of the respective signal at different times. The plots of FIG. 9 graphically display results from a "brute force" method of stepping through each of the sixty-four (64) DAC settings, starting with DAC setting "0" at time "0", and ending at DAC setting "63". The signal shown in the top plot is the input to the estimation circuit 452 and 453. The first and second plots represent the voltage level relative to a peak clip point of the A/D converter. In this example, the A/D converter clip point is assumed to be 1 v peak. The top signal includes the calibration signal 610 plus noise. The vertical axis of the first and second plots is in units of voltage. The next plot beneath show the absolute power estimates at the output of the estimation circuit, i.e., the bandpass infinite impulse response. The vertical axis of the third plot is in units of power ($v^2$, assuming a 1 ohm resistance). The bottom two plots show the power estimate, in decibels, for the I-channel and the Q-channel. The vertical axis of the fourth and fifth plots is in units of dBW (i.e., $10 \log_{10} v^2$). The bottom two plots show that the minimum IMD2 for the mixer 414 (I-channel) occurs at DAC setting "31", and the minimum IMD2 for the mixer 415 (Q-channel) occurs at DAC setting "32".

Direct sequence spread spectrum (DSSS) modulation is used in many communication systems, such as in the global positioning system (GPS), cellular protocols such as IS-95, wideband code division multiple access (WCDMA) and CDMA2000, and wireless local area network (LAN) and personal area network (PAN) protocols such as IEEE 802.11b (Wi-Fi®) and IEEE 802.15.4 (ZigBee™). The term "DSSS" used herein refers to any digital modulation scheme in which a group of M information bits is mapped at a transmitter to one N-chip codeword of a set of N-chip codewords prior to modulation using, for example, phase modulation, then de-mapped at a receiver from a received N-chip codeword to a group of M information bits during demodulation.

In addition to the two-tone method used with the circuits of FIGS. 4 and 10 described hereinabove, three DSSS methods, used with the circuits of FIGS. 10, 11 and 14, tune the IP2 of the mixer using a DSSS signal as the calibration signal. Two of these three DSSS methods rely on the fact that squaring a DSSS quadrature phase-shift keying (QPSK) or binary phase-shift keying (BPSK) signal results in creating tonal components at frequencies that are multiples of the chip rate. The squaring of the DSSS signal occurs due to non-linearities in the mixer of the receiver. The tonal component that is of particular usefulness is the component having the same frequency of the chip rate. None of the three DSSS methods impact the sensitivity of the receiver during the re-tuning of the mixer because no tone is injected into the receive signal path. Each of the three DSSS methods tunes the mixer to its highest IP2, thereby ensuring that the impact of the IMD2 is minimized. Any of the three DSSS methods are used for periodic tuning the IP2 of the mixer during normal receive operation. Any of the DSSS methods are also used for tuning the IP2 of the mixer at a cold start of the transceiver.

Figure 10:
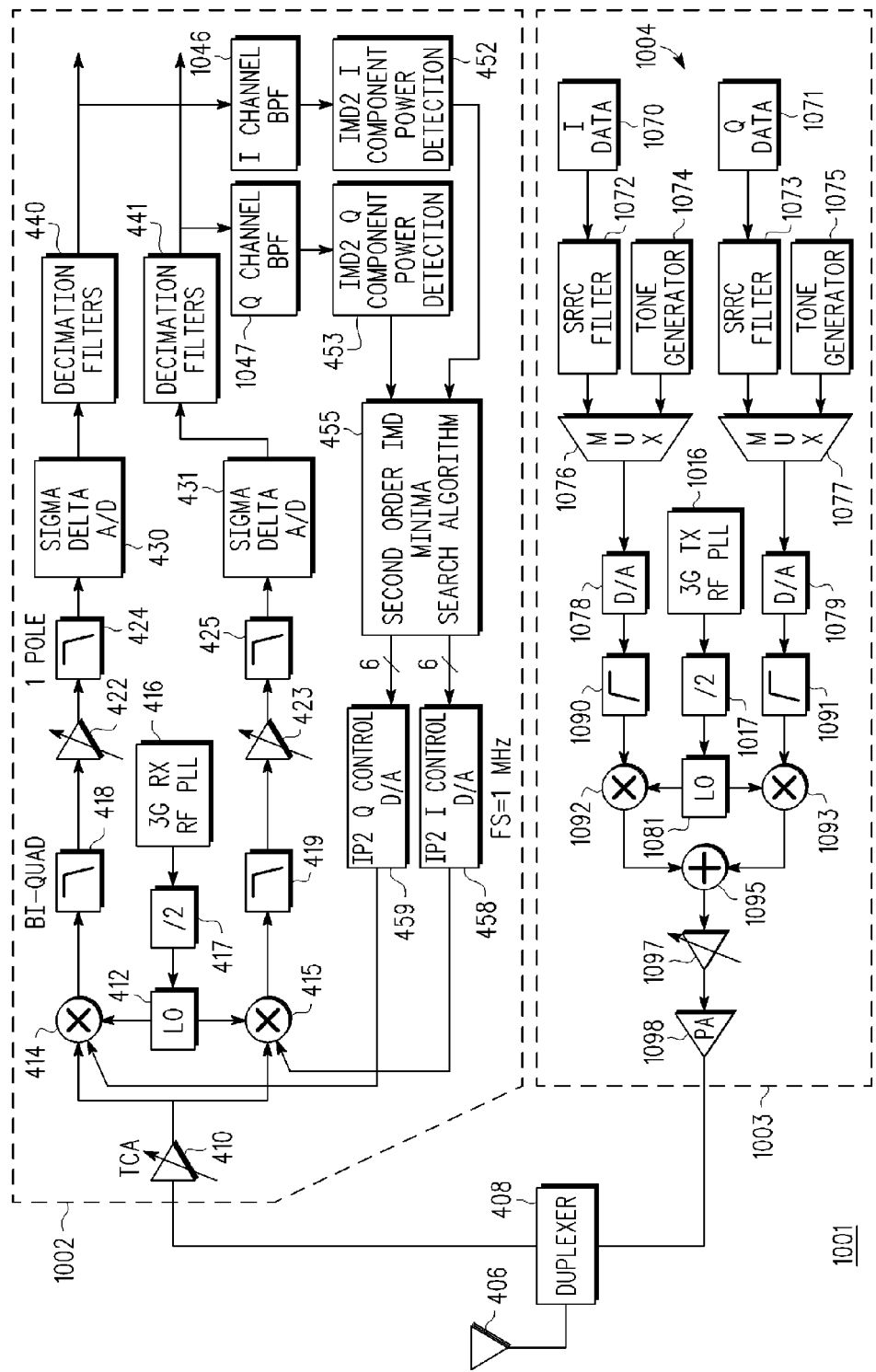
FIG. 10 is a simplified functional block diagram of a transceiver used in conjunction with another two-tone method, and, alternatively, with a first DSSS method, which uses a two-level PN training sequence.

FIG. 10 is a simplified functional block diagram of a portion of a transceiver 1001 used in conjunction with another two-tone method, and, alternatively, with a first DSSS method that uses a two-level pseudorandom noise (PN) training sequence. The transceiver 1001 includes a receiver 1002, a transmitter 1003 and an IP2 tuning circuit 1004. The transmitter 1003 also comprises other components (not shown). Such other components generate I-data 1070 and Q-data 1071. The transmitter also comprises a square root raised cosine (SRRC) filter 1072 and 1073 coupled to the I-data 1070 and the Q-data 1171, respectively. The transmitter 1003 includes a tone generator 1074 and 1075 for generating the instrument signals 622 and 623. The transmitter also comprises a multiplexer 1076 and 1077 coupled to the tone generator and to the SRRC filter 1072 and 1073. The multiplexer 1076 and 1077 allows either the instrument signals or a normally-transmitted signal, to be selected for transmission. The output of the multiplexer 1076 and 1077 is coupled to a D/A converter 1078 and 1079. The D/A converter is coupled to an analog baseband filter 1090 and 1091. The transmitter also comprises a local oscillator 1081, an I-phase mixer 1092 and a Q-phase mixer 1093. The output of the D/A converter 1078 and 1079 is coupled to the mixers. The mixers 1092 and 1093 are driven by the local oscillator 412. The frequency of the local oscillator 412 is controlled by a 3G transmit RF phase locked loop 1016 that is coupled to a divide-by-two circuit 1017. The I-phase signal and the Q-phase signal are summed at an adder 1095. The composite signal is amplified by a tone-level amplifier 1097, and then amplified by a power amplifier 1098.

The IP2 tuning circuit 1004 includes an I-channel highpass filter 1046 and a Q-channel highpass filter 1047 that are coupled to the output of decimation filter 440 and 441, respectively, in the receiver 1002. The bandpass filter 1046 and 1047 has a center frequency of the calibration signal. Most of the other elements of the receiver 402 of FIG. 4 are similar to corresponding elements of the receiver 1002 of FIG. 10; therefore, a detailed description of the elements common to both FIG. 4 and FIG. 10 will not be repeated.

The two-tone method used with the transceiver 1001 of FIG. 10 differs from the two-tone method used with the transceiver 401 of FIG. 4 in the following ways. With the two-tone method used with the transceiver 1001, the tone generator 1074 and 1075 is at the transmitter, and the transmitter is adapted to allow the instrument signals 622 and 623 to be transmitted by the transmitter. The instrument signals are then received by the receiver 1002 via leakage at the duplexer 408. Another difference is that with the two-tone method used with the transceiver 1001, the instrument signals are not injected, via a direct connection, into the mixer of the receiver 1002. In most other respects, the two-tone method used with the circuit of FIG. 4, and the two-tone method used with the circuit of FIG. 10 operate in a similar manner; therefore, the two-tone method used with the circuit of FIG. 10 will not be explained in further detail.

The first DSSS method, which is also used in conjunction with the transceiver 1001 of FIG. 10, uses a two-level DSSS signal. With the first DSSS method, the transceiver 1001 uses the two-level WCDMA DSSS signal of the transceiver's own transmitter 1003, to tune the IP2 of the mixer 414 and 415 of the receiver 1002. In an exemplary embodiment, the chip rate of the two-level WCDMA DSSS signal is 3.84 MHz. With the first DSSS method, a 3.84 MHz calibration signal is produced. With the first DSSS method, the center frequency of the bandpass filter 1046 and 1047 is the frequency of the calibration signal. The first method uses the IMD2 of the DSSS transmitted signal to tune the IP2. With the first method, it is unnecessary to know the content of the WCDMA transmitted data, i.e., the two-level PN training sequence. It is only necessary to know the chip rate of the DSSS signal that is used to tune the IP2.

With the first DSSS method, the SNR of the 3.84 MHz calibration signal is a function of the transmitted power, the IP2 of the mixer, the analog selectivity at the IMD2 location, the desired signal strength (either the average energy per PN chip for the dedicated physical channel, DPCH_EC, or the average energy per PN chip for the Ior) and the bandwidth of the estimation circuit 452 and 453. The first DSSS method can be used with a typical 3G receiver that has minimum analog selectivity. The performance of the first DSSS method, which uses the two-level PN training sequence having a chip rate of 3.84 MHz, is a function of a) the power of the transmitted signal, b) the IP2 of the mixer, c) the power of the received signal, and d) whether there are blockers present. It should be noted that if the first DSSS method is used at any time other than at a cold start, the signal at 3.84 MHz could be due to the squaring of the signal from transceiver's own transmitter.

Figure 1:
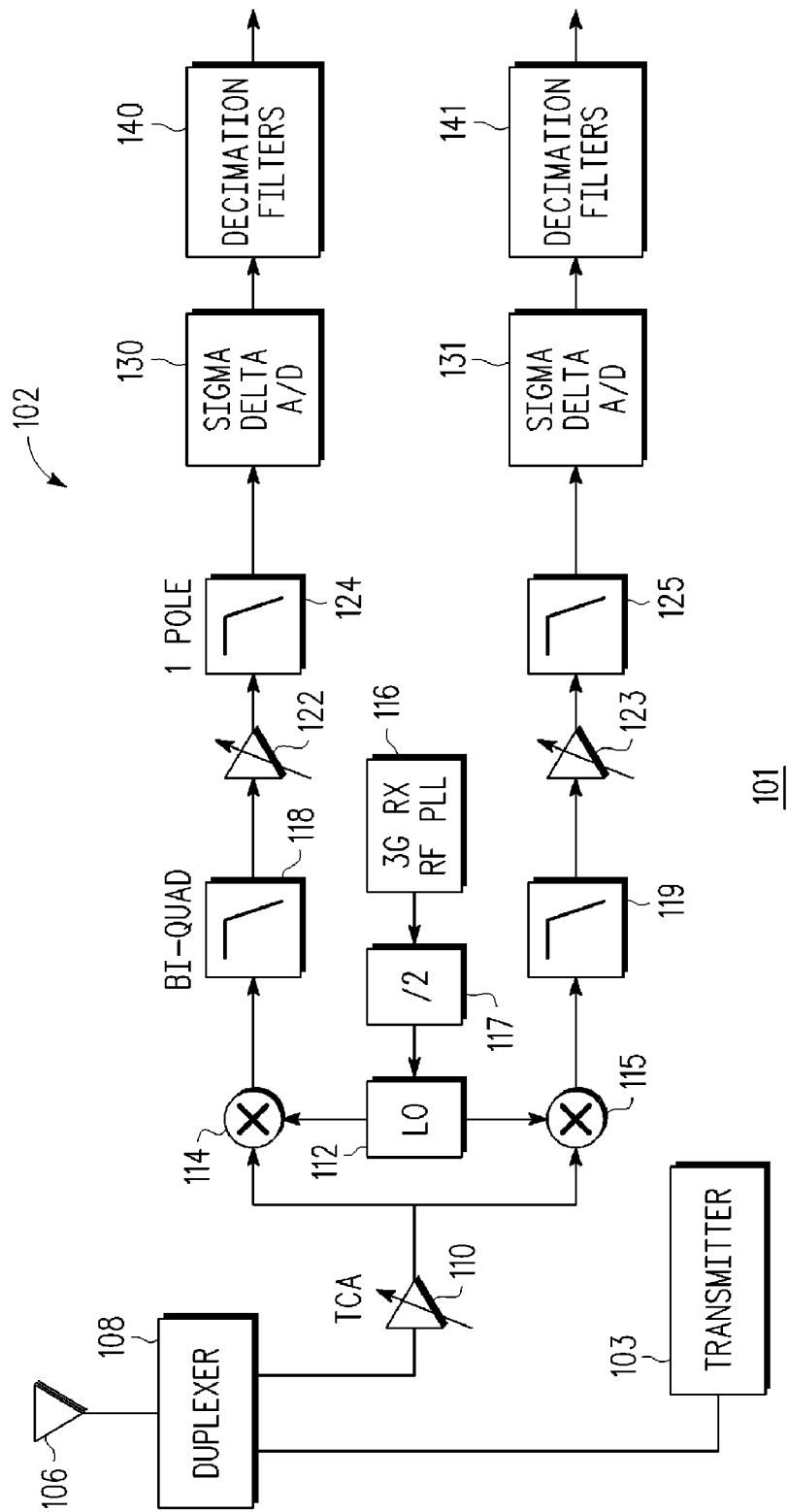
FIG. 1 is a simplified functional block diagram of a typical known direct-conversion receiver that includes mixers and an analog-to-digital converter.
Figure 2:
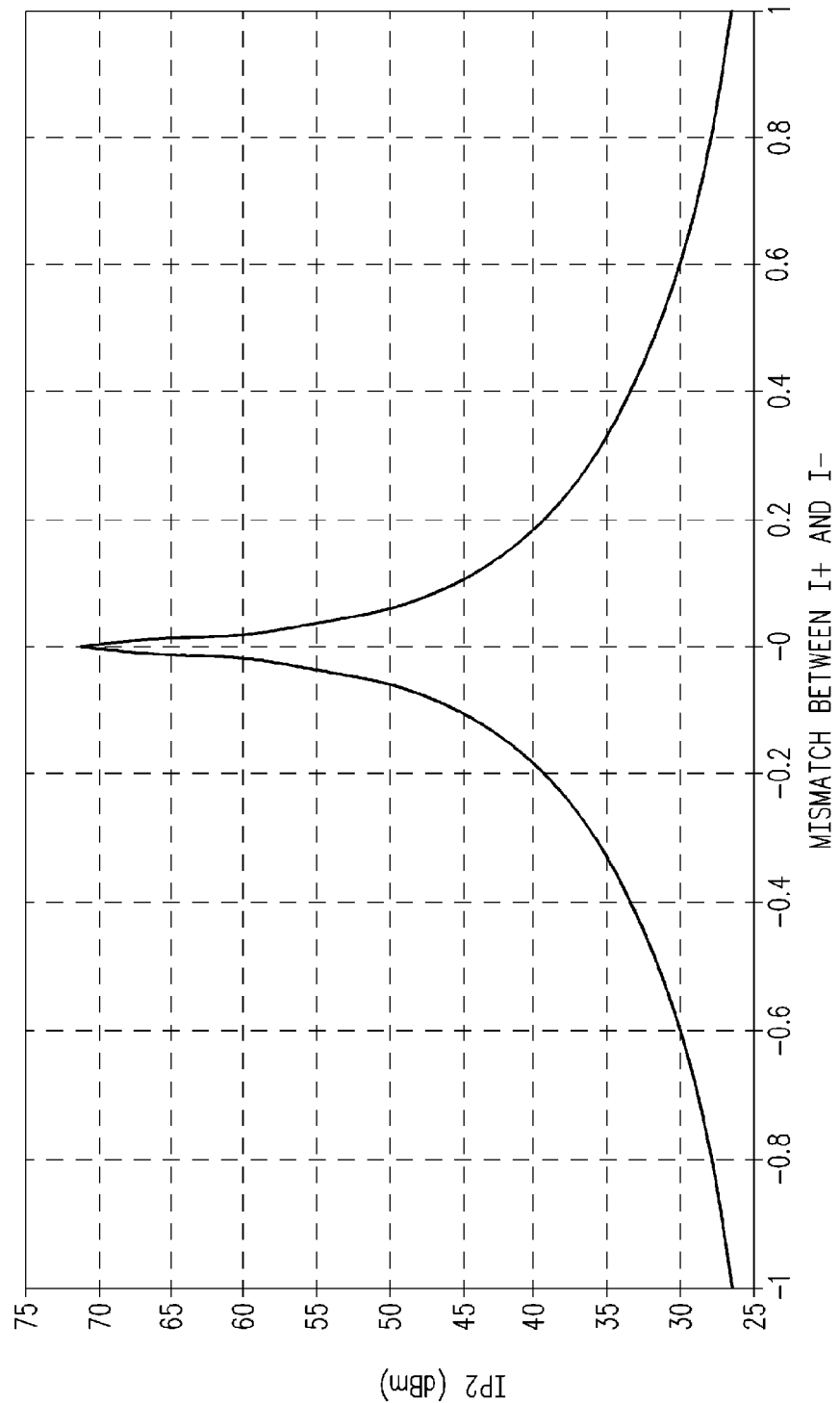
FIG. 2 is an idealized graph showing how the IP2 of one of the mixers of FIG. 1 can vary due to manufacturing processes and/or change in temperature.
Figure 3:
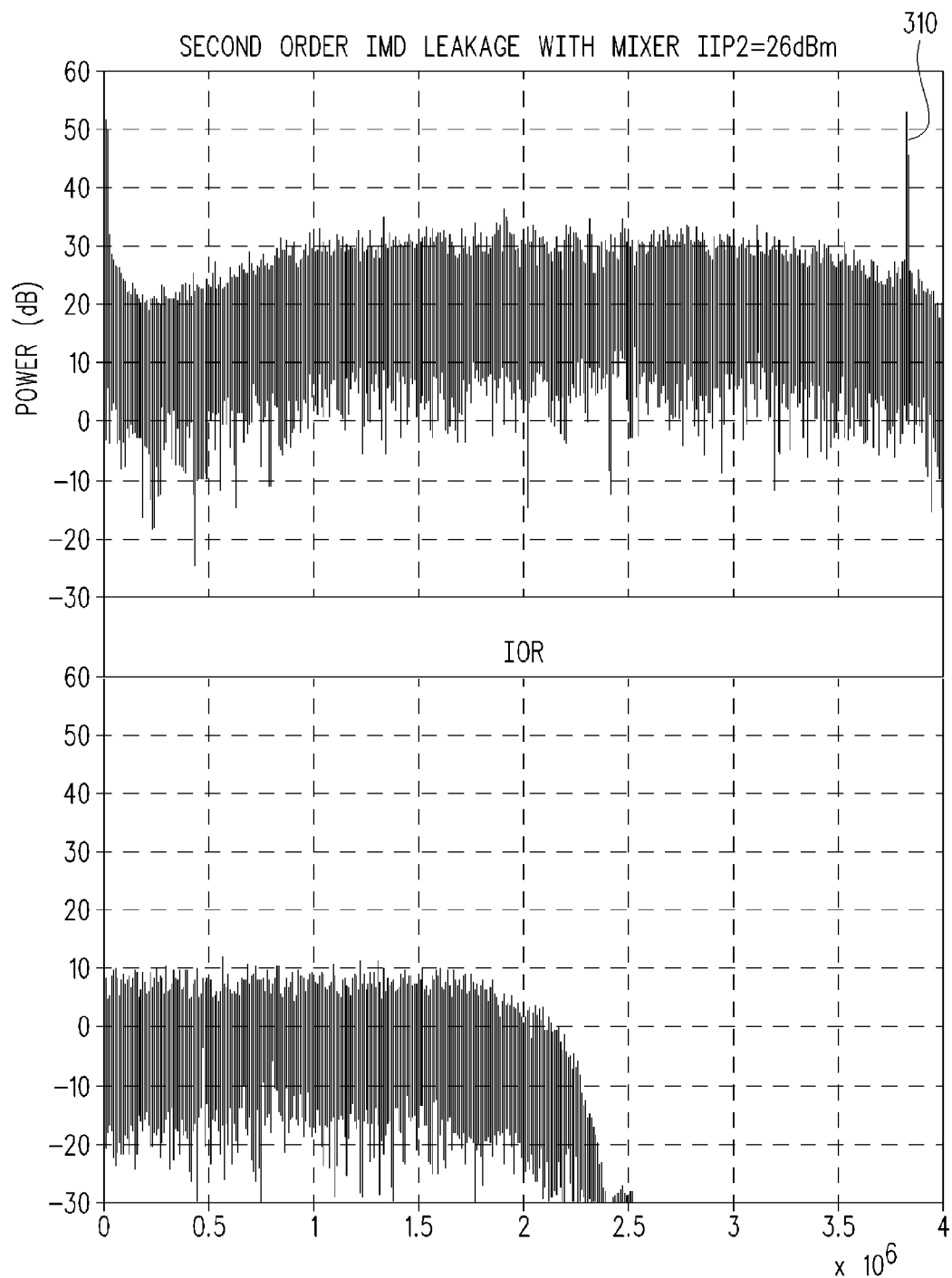
FIG. 3 is a graph of the or and the IMD2, versus frequency, at the input of an analog-to-digital converter in the known circuit of FIG. 1.

As can be seen in prior art FIG. 3, the IMD2 from the transmitted signal creates a strong tone 310 at 3.84 MHz. In FIG. 5, the tone 510 at 3.84 MHz is also present, although not as strong. The estimation circuit 452 and 453 estimates the power of the tone 510 at 3.84 MHz. The estimation circuit 452 and 453 is used with a variable center frequency and bandwidth to create a bandpass filter centered at 3.84 MHz. The estimation circuit 452 and 453 ensures that the signal-to-noise ratio of the calibration signal 610 is maximized, thus more accurately measuring the power of the calibration signal. The power estimated by the estimation circuit 452 and 453 is used to dynamically tune the IP2 until a minimum power (a minimum signal-to-noise ratio) at 3.84 MHz is achieved.

As a result of the IP2 tuning circuit 1004 increasing the IP2 to 66 dBm, the power of the tone at 3.84 MHz becomes less than it is without the IP2 tuning circuit (see FIGS. 3 and 5). As shown in FIG. 5, the limit of the performance of the IP2 tuning circuit 1004 and the first DSSS method used therewith is being approached due to the reduction in the power of the calibration signal at 3.84 MHz; however, the calibration signal 610 can nevertheless be detected if the bandwidth of the estimation circuit 452 and 453 is narrowed sufficiently.

Figure 11:
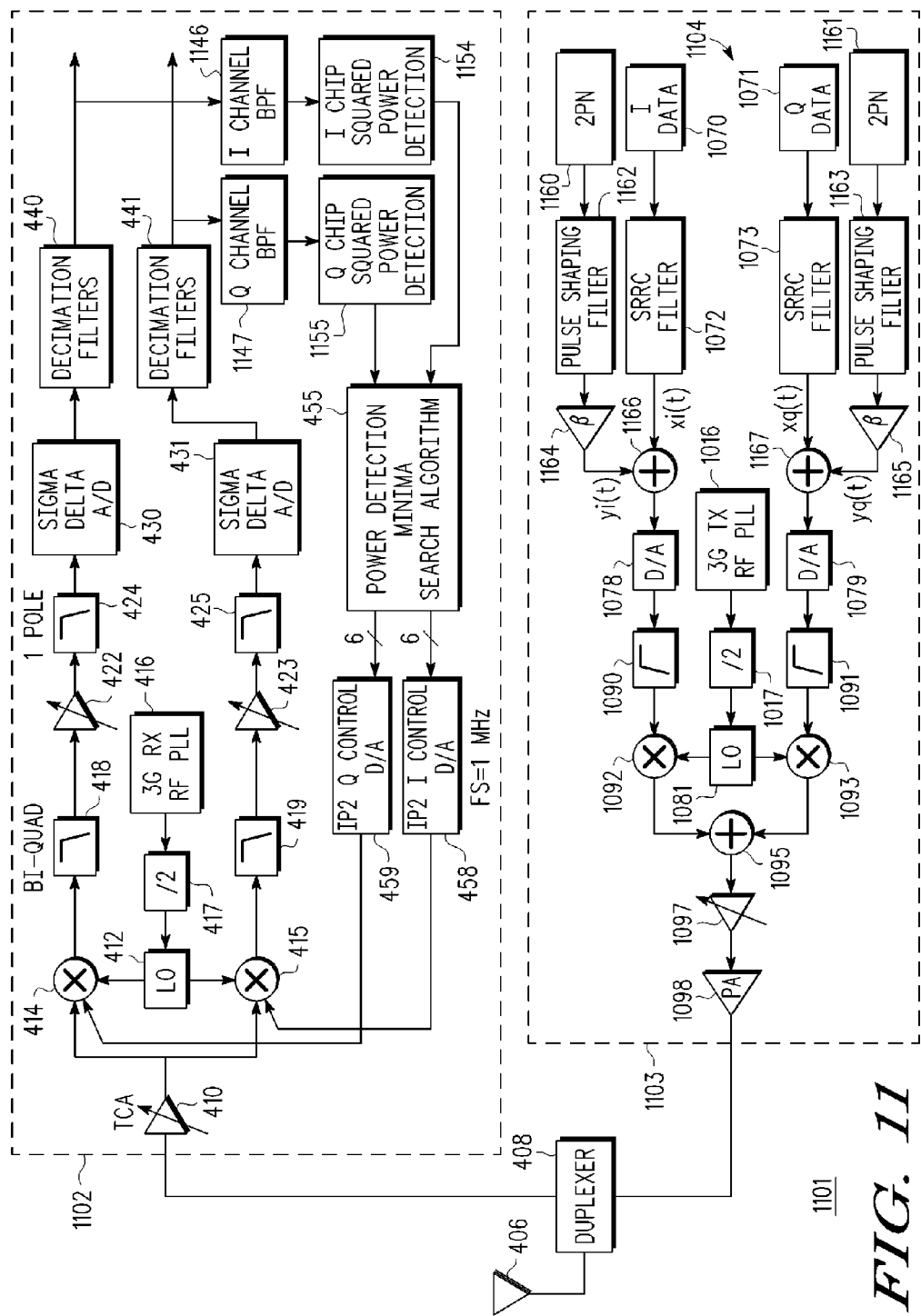
FIG. 11 is a simplified functional block diagram of a transceiver used in conjunction with a second DSSS method, which uses another two-level PN training sequence.

FIG. 11 is a simplified functional block diagram of a portion of a transceiver 1101 used in conjunction with a second DSSS method that uses another two-level PN training sequence. The transceiver 1101 includes a receiver 1102, a transmitter 1103 and an IP2 tuning circuit 1104. The IP2 tuning circuit 1104 comprises, in the receiver, a bandpass filter 1147 and 1148, an I-chip squared power detection circuit 1154 and a Q-chip squared power detection circuit 1155. The IP2 tuning circuit 1004 also comprises, in the transmitter, a sequence shift register 1160 and 1161 that generates a square wave. The sequence shift register 1160 and 1161 is coupled to a pulse shaping filter 1162 and 1163 that smooths the sharp edges of the square wave. The pulse shaping filter is coupled to an amplifier 1164 and 1165. The amplifier 1164 and 1165 is coupled to an adder 1166 and 1167. Most of the elements of the other transceiver 1101 of FIG. 11 are similar to corresponding elements of the transceiver 1001 of FIG. 10; therefore, a detailed description of the elements common to both FIG. 11 and FIG. 10 will not be repeated.

As with the first DSSS method, the second DSSS method (used with transceiver 1101 of FIG. 11) also uses a two-level DSSS signal. However, the second method does not use the transceiver's own two-level WCDMA DSSS signal to tune the IP2 of the mixer 414 and 415 of the receiver 1102. With the second method, another two-level PN training sequence is specifically generated. The sequence shift register 1160 and 1161 generates the specifically-generated PN sequence used by the second DSSS method. The specifically-generated two-level PN training sequence used by the second method has a chip rate different from the chip rate of the transceiver's own WCDMA DSSS signal. In an exemplary embodiment, the specifically-generated two-level PN training sequence used by the second method has a chip rate of 1.92 MHz. The center frequency of the bandpass filter 1147 and 1148 is at the chip rate of the specifically-generated two-level PN training sequence. In an exemplary embodiment, the center frequency of the bandpass filter 1147 and 1148 is 1.92 MHz. The specifically-generated two-level PN training sequence is summed with the transceiver's own transmitted WCDMA DSSS signal. The second method uses the specifically-generated two-level PN training sequence to tune the IP2 of the mixer. The second method filters the summed signal at the chip rate of the specifically-generated two-level PN training sequence. The second DSSS method uses a more complex circuit (see FIG. 11) than the circuit (see FIG. 10) used by the first DSSS method because the second DSSS method has an additional sequence shift register (not shown) that generates the specifically-generated PN sequence used by the second DSSS method.

With the second DSSS method, it is not necessary to know the content of the transmitted data, i.e., the two-level PN training sequence. With the second method, it is only necessary to know the chip rate of the specifically-generated DSSS signal that is used to tune the IP2 of the mixer. Unlike with the first DSSS method, with the second DSSS method there is no need to consider the transceiver's own transmitted signal. There is less of a need to be concerned about adjacent channels or blockers with the second method than there is with the first method. The performance of the second method is a function of a) the power of the transmitted signal, b) the IP2 of the mixer, and c) the power of the received signal. With the second method, the frequency of the calibration signal is selectable so that it is not near any blockers; therefore, the performance is not limited by whether there are blockers present. The power of transmit signal is selected so that there is no need to alter the transmitter and its mask. The power of the two-level PN training sequence is selected to be sufficiently weaker than the normally-transmitted WCDMA signal, so that the two-level PN training sequence does not interfere with the normally-transmitted WCDMA signal; thus, the two-level PN training sequence has negligible impact on a base station's sensitivity.

In general, as the IP2 of the mixer increases, or as the transmit signal power decreases, or when the received signal power increases, the performance of the first and second DSSS methods degrades. In a receiver that has a large amount of analog selectivity, the second method more accurately measures the power of the calibration signal than does the first method, because the frequency of the calibration signal is closer to the center frequency of the received channel with the second method than with the first method. In the second method, a specifically-generated two-level PN training sequence is summed with the two-level PN sequence of the normally-transmitted signal of the transceiver.

Because the equations for the Q-phase component of the signal are calculated in similar manner to I-phase component, hereinafter, only the equations for the I-phase component are given. The summed signal, $Tx_i(t)$, of the I-phase component is calculated as follows:

$$Tx_i(t) = x_i(t) + \beta y_i(t)$$

where x(t) is the pulse shaped transmitted data and y(t) is the pulse-shaped two-level PN training sequence. The value of $\beta$ is chosen to ensure that the two-level PN training sequence that is summed has no impact on the spectral mask of the transmitter. With the second DSSS method, the calibration tone can be placed at any frequency. If there is too much analog selectivity, a lower frequency chip rate, i.e., lower tone frequency, is chosen. If there is a blocker at 3.84 MHz or if the desired signal is impacting the estimate, another calibration frequency is used. If there is significant noise peaking due to the A/D converter 430 and 431 at 3.84 MHz, another calibration frequency is used.

Figure 12:
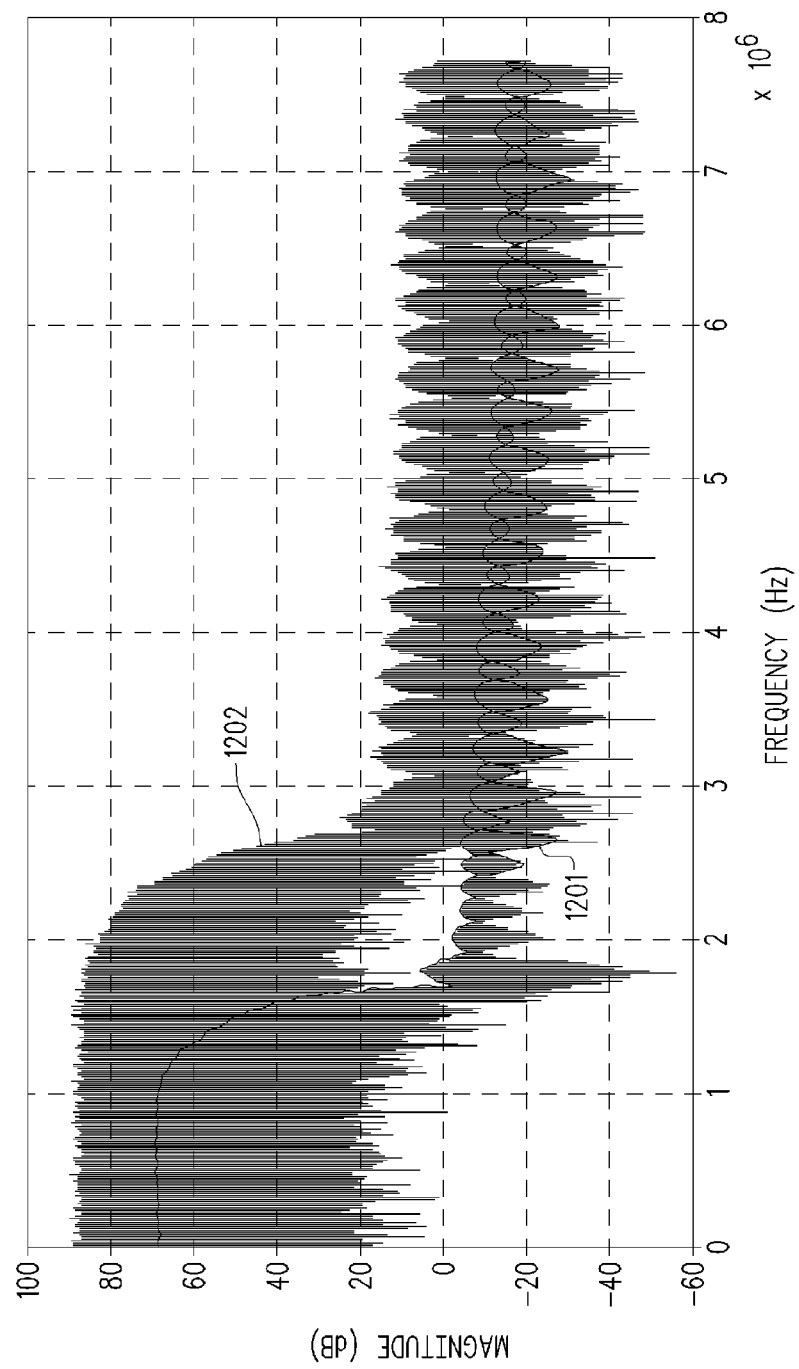
FIG. 12 is a graph of a magnitude response of a transmit signal versus frequency for the transceiver of FIG. 10.

FIG. 12 shows an individual magnitude response 1201 of the specifically-generated two-level PN training sequence used in conjunction with the second DSSS method, and a combined magnitude response 1202 of the transmitted signal summed with the specifically-generated two-level PN training sequence. FIG. 12 shows that using the specifically-generated two-level PN training sequence at 1.92 MHz has no impact on the spectral mask of the transmitted signal.

Figure 13:
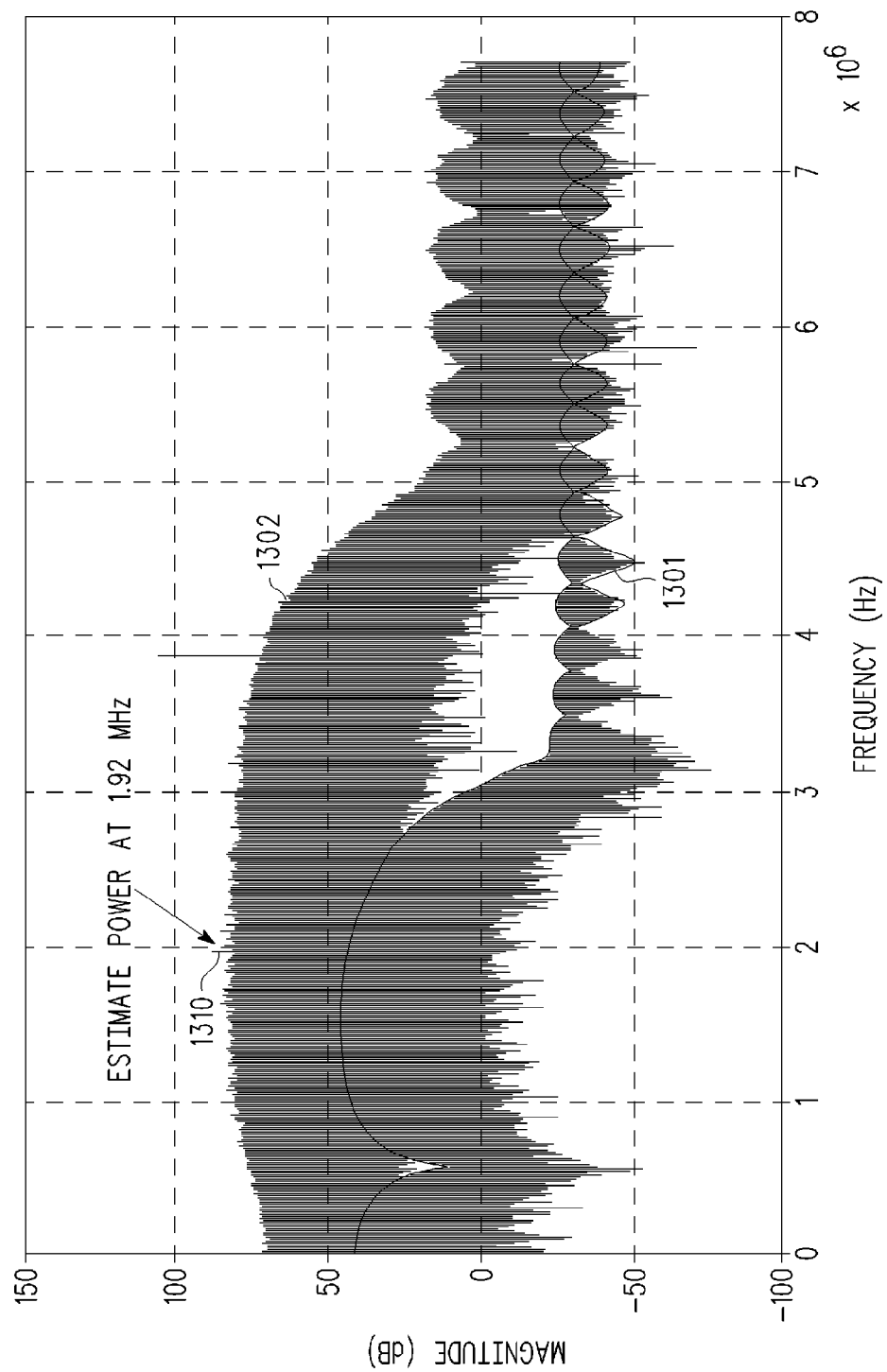
FIG. 13 is a graph of the IMD2 resulting from the sum of the transmitted signal and the two-level PN training sequence, for the transceiver of FIG. 10.

FIG. 13 shows the IMD2 after the signal passes through the nonlinear effects in the mixer of the receiver 1102. The calibration signal 1310, which is used with the second DSSS method in conjunction with the circuit of FIG. 11, exists at 1.92 MHz. In particular, FIG. 13 shows an individual magnitude response 1301 of the IMD2 from the specifically-generated two-level PN training sequence used in conjunction with the second DSSS method, and a combined magnitude response 1302 of the IMD2 from the transmitted signal summed with the specifically-generated two-level PN training sequence. By injecting a known training signal, rather than relying on the normally-transmitted signal, the location of the calibration signal can be controlled, thus ensuring a better SNR. Use of the second DSSS method ensures that the resultant calibration tone at the chip rate of the two-level PN training signal does not fall on an adjacent channel, or on the IMD2 created by the receive signal, or at a location impacted by rising noise from the A/D converter 430 and 431. There is more noise from the A/D converter 430 and 431 at 3.84 MHz than at 1.92 MHz.

To be able to properly tune the IP2 of the mixer the first DSSS method, the IMD2 (at 3.84 MHz) that occurs as a result of the transmitter's WCDMA signal must be stronger than the receive signal's IMD2 (at 3.84 MHz) and any noise or interference located at 3.84 MHz. This is a function of the bin width of the discrete Fournier transform used in the Goertzel filter of the I-component power detection circuit 452 and the Q-component power detection circuit 453, and of the I-chip squared power detection circuit 1154 and the Q-chip squared power detection circuit 1155.

To be able to properly tune the IP2 of the mixer using the second DSSS method, the IMD2 (at 1.92 MHz) that occurs as a result of the specifically-generated two-level PN training sequence, must be stronger than both the transmit IMD2 that falls at 1.92 MHz (the squared version of the transmit signal falls within the bandwidth of the receiver) and the receive signal at 1.92 MHz. Both the first method and second DSSS methods work well under the worst case conditions, i.e., when the transmit signal is at maximum power and the receive signal is at sensitivity, i.e., IMD2 power to receive signal ratio is the greatest. It is precisely under these conditions that tuning the IP2 is most important because without the tuning the IP2 the SNR may be insufficient to meet a required BER. FIGS. 3 and 5 illustrate that the IMD2 is strong enough to be detected above a receive signal at sensitivity, but, as the power of the receive signal increases or transmit power decreases, the methods may not perform as well. Fortunately, under these conditions (the power of the receive signal increasing and/or transmit power decreasing), tuning the IP2 is less important because the SNR is sufficient to meet the required BER.

Figure 14:
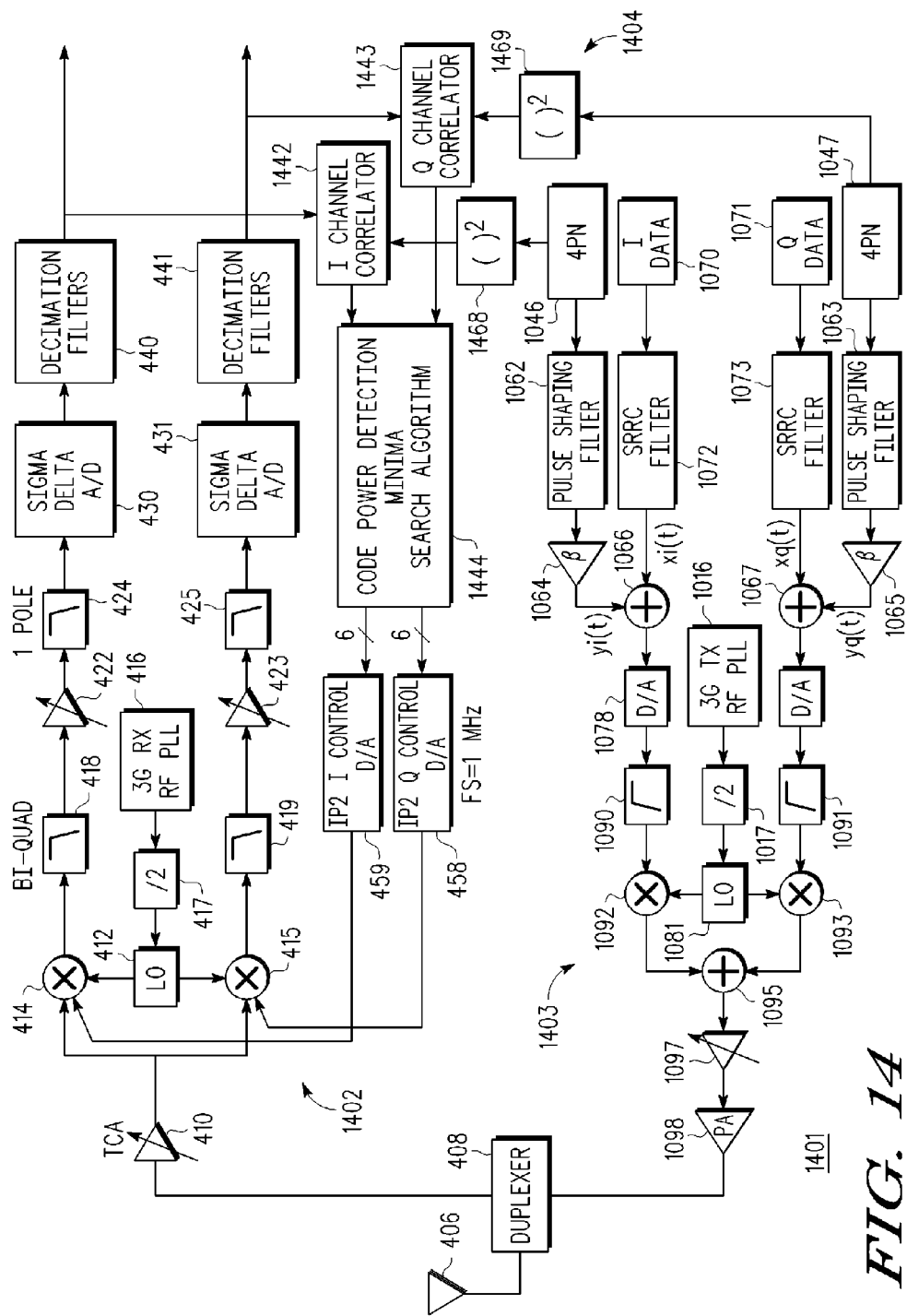
FIG. 14 is a simplified functional block diagram of a transceiver used in conjunction with a third DSSS method, which uses a four-level PN sequence.

FIG. 14 is a simplified functional block diagram of a portion of a transceiver 1401 used in conjunction with a third DSSS method, which uses a known four-level PN sequence (16-QAM) that is specially generated. The transceiver 1401 includes a receiver 1402, a transmitter 1403, and an IP2 tuning circuit 1404. The transceiver 1401 includes a sequence shift register 1446 and 1447 that generates the known four-level PN sequence. Most of the elements of the transceiver 1401 of FIG. 14 are similar to corresponding elements of the transceiver 1101 of FIG. 11; therefore, a detailed description of the elements common to both FIG. 14 and FIG. 11 will not be repeated.

Figure 15:
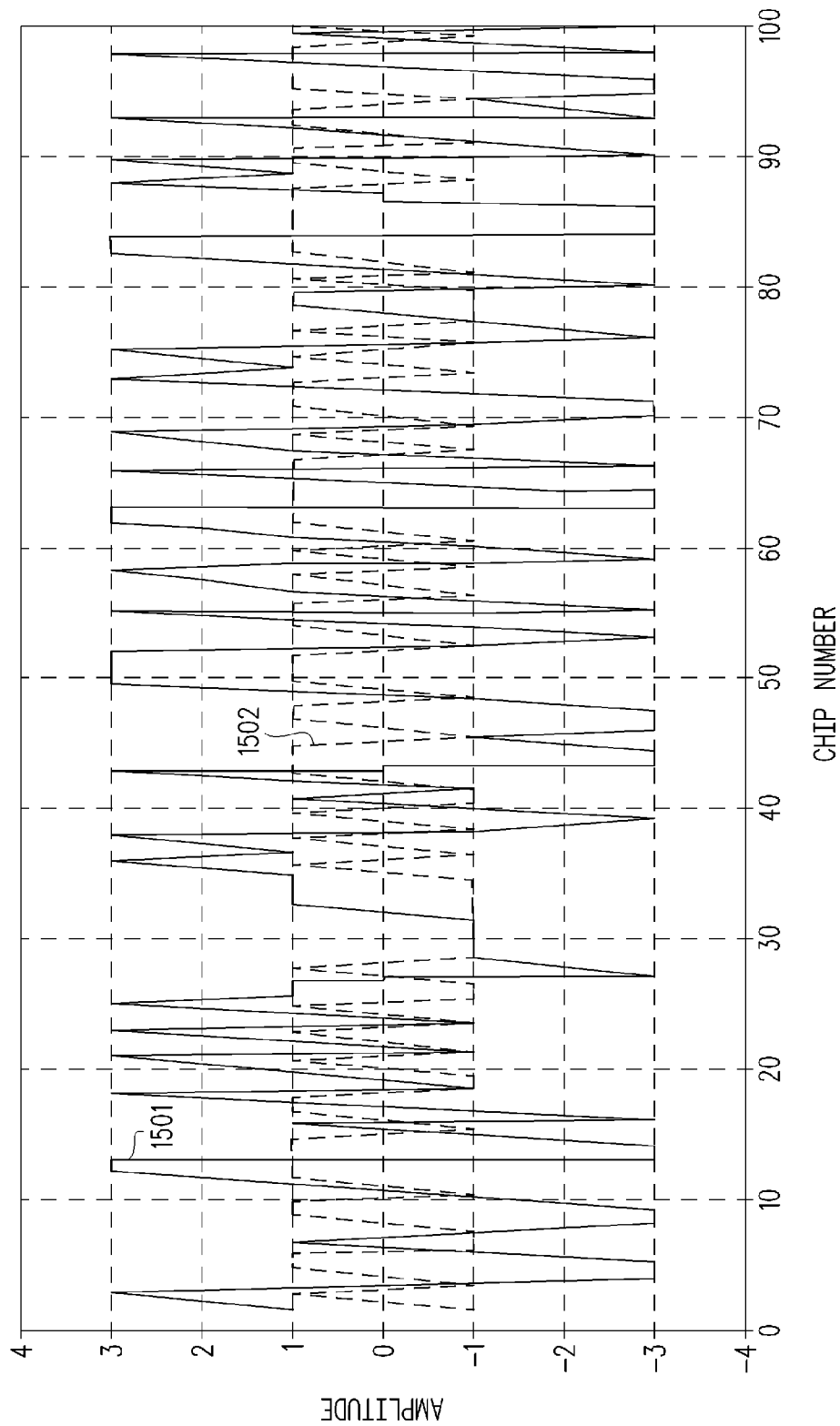
FIG. 15 is a chart of an example of the four-level PN sequence and its squared version used in conjunction with the third method and the transceiver of FIG. 14.

FIG. 15 is a chart of an example of a four-level PN sequence 1501 and its squared version. Because the content of the four-level PN sequence 1501 is known, the content of the resulting two-level PN training sequence 1502 produced therefrom is also known.

Referring again to FIG. 14, a squaring circuit 1468 and 1469, coupled to the sequence shift register 1446 and 1447, squares the known four-level PN sequence 1501, and the known two-level PN training sequence 1502 is produced. The two-level PN training sequence 1502 from the squaring circuit 1468 and 1469 is inputted into an I-channel correlator 1442 and a Q-channel correlator 1443. The sequence shift register 1446 and 1447 is also coupled to a pulse-shaping filter 1062 and 1063. As a separate operation from the squaring operation, the known four-level PN sequence 1501 is also sent through the pulse-shaping filter 1062 and 1063 and through an amplifier 1064 and 1065 that has a gain of $\beta$. The gain of the amplifier 1064 and 1065 is set so that the known four-level PN sequence 1501 has no impact on the transmitted spectrum. The known four-level PN sequence 1501 is then summed with the transceiver's own WCDMA DSSS signal. The summed signal is transmitted by the transmitter 1403. The transmitted four-level PN sequence 1501 and the transceiver's own WCDMA DSSS signal are received at the front end of the receiver 1402 as leakage through the duplexer 408. Because of non-linearities in the mixer 414 and 415, a two-level PN training signal is produced in the mixer from the four-level PN sequence 1501. The two-level PN training sequence, which has the same chip rate as the four-level PN sequence, is outputted from the mixer is used by the IP2 tuning circuit 1404 to tune the IP2. Because the content of the four-level PN sequence 1501 is known, the content of the resulting two-level PN training sequence produced at the mixer is also known.

The correlator 1442 and 1443 correlates the resulting two-level PN training sequence 1502 outputted by the squaring circuit 1468 and 1469 with the two-level PN training outputted by the mixer 414 and 415. With knowledge of the content of this sequence, the code power detection circuit 1444 determines the composite power in the chips of each codeword of the two-level PN training sequence, and the DAC setting is adjusted to minimize the IMD2. The correlator 1442 and 1443 can run for a very long period and can make subtle updates to the DAC setting of the mixer, as needed. The third DSSS method does not have the drawbacks of the other methods if the integration period is sufficiently long. With the third method, the power of transmit signal is selected so that there is no need to alter the transmitter, and so that the transmit mask is not affected.

With the third DSSS method, the IP2 of the mixer can be accurately estimated regardless of the power of the transmitted signal, the IP2 of the mixer and the Ior. The overall performance of the third method is only a function of type and length of the PN sequence. This is accomplished by using a known four-level PN sequence with a sufficiently large spreading factor summed with the transmitted signal. As in the second method, the summed signal, $Tx_i(t)$, of the third method is calculated as follows:

$$Tx_i(t) = x_i(t) + \beta y_i(t)$$

where x(t) is the WCDMA transmitted signal and y(t) is the four-level PN sequence. As with the second method, it is necessary that the four-level PN sequence of the third method, y(t), does not interfere with the desired transmitted signal.

Modeling the IP2 of the mixer is as follows:

$$g(t) = \alpha_1 m(t) - \alpha_2 m^2(t)$$

where m(t) is the input of the mixer and g(t) is the output of the mixer. The preceding equation is re-written as:

$$g(t) = \alpha_1(Tx_i(t)\cos(\omega_1 t) + r(t)) - \alpha_2(Tx_i(t)\cos(\omega_1 t) + r(t))^2$$

The input signal includes the transmitted leakage signal and the received signal:

$$g(t) = \alpha_1(x_i(t)\cos(\omega_1 t) + \beta y_i(t)\cos(\omega_1 t) + r(t)) - \alpha_2(x_i(t)\cos(\omega_1 t) + \beta y_i(t)\cos(\omega_1 t) + r(t))^2$$

where the transmitted signal is at some frequency offset, $\omega 1$, from the received signal r(t).

The direct conversion mixer 414 and 415 shifts the desired signal, r(t), to baseband, and the biquad filter 418 and 419 attenuates all higher frequency signals (located at $\omega 1$ and $2\omega 1$). After completing the squaring and filtering out higher frequency terms, the following equation shows the remaining signals at the output of the biquad filter:

$$k_i(t) = \alpha_1 r_i(t) - \alpha_2(x_i^2(t) + (\beta y_i(t))^2 + r_i^2(t) + \beta x_i(t)y_i(t))$$

At the output of the mixer is seen the received signal, r(t), a squared version of the transmitted signal, $x_i(t)$, a squared version of the received signal r(t), a squared version of the four-level PN sequence, $y_i(t)$, and the cross term including the transmitted signal and the four-level PN sequence. The goal is to select $y_i(t)$ such that a squared version of $y_i(t)$ is easily detectable and is uncorrelated with all the other signals at the output of the mixer. This is achievable with a four-level PN sequence with a sufficiently large spreading factor, for $y_i(t)$. The squared version of this four-level PN sequence has a low cross correlation with the transmitted signal and with the squared version of the transmitted signal. The random sequence is defined as follows:

$$y(t) = \beta \sum_k d_k p(t - kT_s)$$

where sequence $d_k$ is generated by a simple binary/m-ary shift register, p(t) is the pulse shape and $\beta$ is the attenuation of the PN signal.

The signal y(t) is present in the transmitter 1403. The signal that is present in the receiver 1402 at baseband after the selectivity from the biquad filters is a squared version of y(t).

$$(y^2(t)) = \left(\beta \sum_k d_k p(t - kT_s)\right)^2$$

The energy at $t = T_s$ (assuming that there is no, or minimal, inter-symbol interference) is as follows:

$$(y^2(kT)) = \left(\beta \sum_k d_k\right)^2$$

If a standard two-level PN sequence is used, the result is as follows:

$$(y^2(kT)) = \beta^2$$

When $\{+1, -1\}$ is squared, the result is $\{+1, +1\}$, i.e., the data (or the PN sequence) has been removed. Using the third method, which requires a four-level PN sequence with elements $\{-3, -1, 1, 3\}$, the result is as follows:

$$(y^2(kT)) = \beta^2 \sum_k c_k$$

where $c_k$ is a known random sequence with elements $\{+9, +1\}$. If the direct current component is removed, which can be done easily with a highpass filter, $\{+4, -4\}$ remains, which is an ideal two-level PN training sequence that is uncorrelated with all the other signals present. In an exemplary embodiment, the receiver 1402 uses a specific modulation (16-QAM or quadrature amplitude modulation). The correlator uses a very long correlation period to measure very weak signals. The four-level PN sequence is squared and correlated with the receive signal. The energy determined by the correlator 1442 and 1443 is used to tune the IP2 of the mixer.

The performance of the third DSSS method with a sufficiently long correlation period is no longer a function of a) transmitted power, b) IP2 of mixer, c) desired signal strength, and d) bandwidth of the estimation circuit 452 and 453. With a long enough correlation period (i.e., spreading factor), it is possible to estimate the IMD2 under most circumstances.

By using the four-level PN sequence of the third DSSS method, it can be seen that the method is not limited by the transmitted signal power, by the IP2 of the mixer, or by the power of the received signal. Because the squared version of the four-level PN sequence is uncorrelated with the transmitter data, it is only necessary to integrate over multiple code words, which is similar to increasing the length of the PN sequence. The lengthening of the four-level PN sequence improves the spreading factor, but slows the operation of the estimation circuit 452 and 453. The effectiveness of the third method is neither a function of the power of the transmit signal nor a function of the power of the received signal.

The four-level PN sequence is selected so that its autocorrelation is low and so that the cross correlation between the four-level PN and the transmitted signal is low. Also, the four-level PN sequence is selected so that it is uncorrelated with the squared version of itself (which is a two-level PN sequence). The goal is to ensure that the squared version of the sequence exhibits properties that can be accurately estimated (while not interfering with the transmitted data). The four-level PN sequence is extremely long (so as to have a large processing gain), and certain properties of the sequence are only slowly estimated.

Because the power of a modulated signal is estimated, it may be necessary to perform a timing adjustment in the IP2 tuning circuit 1404, to maximize the SNR at the output of the correlators 1442 and 1443. Because the transmitted four-level PN signal incurs a delay (through the transmit analog, the duplexer, the receive analog and receive digital portions of the transceiver 1401) there is a need for an alignment inside the correlators 1442 and 1443, to properly correlate over the chip period or the symbol period. A delay, which is used as a starting point to simplify a chip timing adjustment algorithm, is empirically generated.

Figure 16:
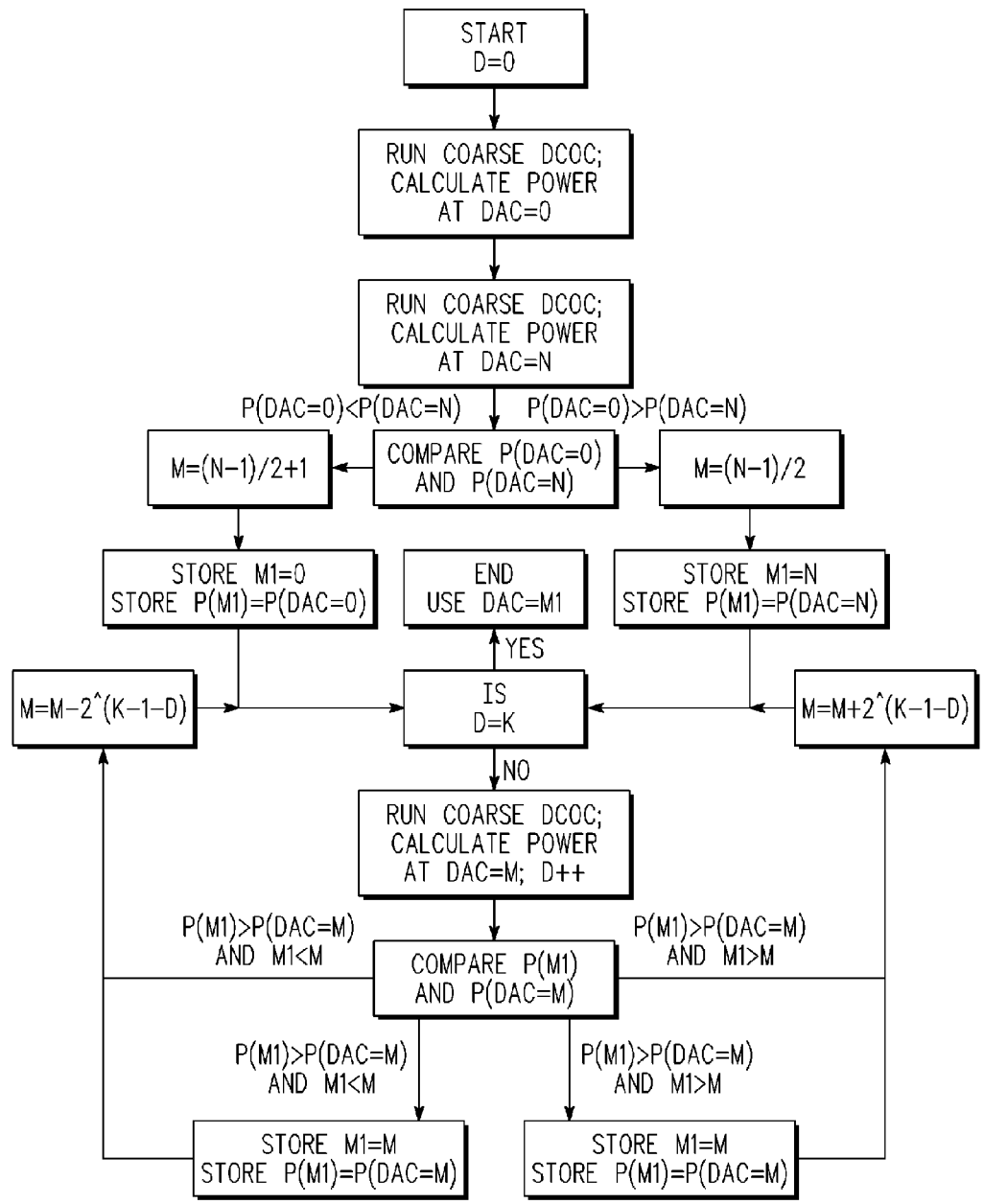
FIG. 16 is a flow diagram illustrating a method of tuning the IP2 during a cold start.

FIG. 16 illustrates a flow diagram of a method to tune the IP2 during a cold start of the receiver 402, 1002, 1102 and 1402. Because there is reasonable certainty that the graph of IP2 versus DAC setting of the mixer 414 and 415 has only one maximum (see FIG. 7), a binary search method is performed by the search algorithm circuit 455 in accordance with the flow diagram of FIG. 16, which finds the maximum IP2 in only eight (8) steps. For example, the binary search method of FIG. 16 steps through setting "0", setting "63", setting "32", setting "16", setting "8", setting "4", and setting "6", prior to stopping at the DAC setting that produces the highest IP2, setting "5". In FIG. 16, K is the number of bits in the DAC, N is the total number of DAC settings, where $N=2^{K-1}$, M is the present setting of the DAC, M1 is the internal optimal DAC setting, and D is the internal count variable that corresponds to the number of iterations. In an exemplary embodiment, the number of DAC settings is set forth in either a six-bit word or an eight-bit word, thereby providing sixty-four (64) or two hundred fifty-six (256) granular DAC steps, respectively. After cold start tuning is accomplished, the DAC setting resides at the optimal IP2. A coarse DCOC algorithm is run after each DAC update because large DC transients can occur from tuning the IP2. The coarse DCOC algorithm is different from the fine DCOC algorithm because the coarse DCOC algorithm supplies a DC inside the analog portion of the receiver. The coarse DCOC algorithm is also run prior to each measuring of the IMD2 power so that wide changes in the DAC setting, which results in wide changes in the IP2, do not clip the A/D converter 430 and 431. Alternatively, a brute force method (not shown) is used, in which a power estimate is taken sequentially at each and every DAC setting to find the maximum IP2. The brute force method was used to generate the data shown in FIG. 9.

Figure 17:
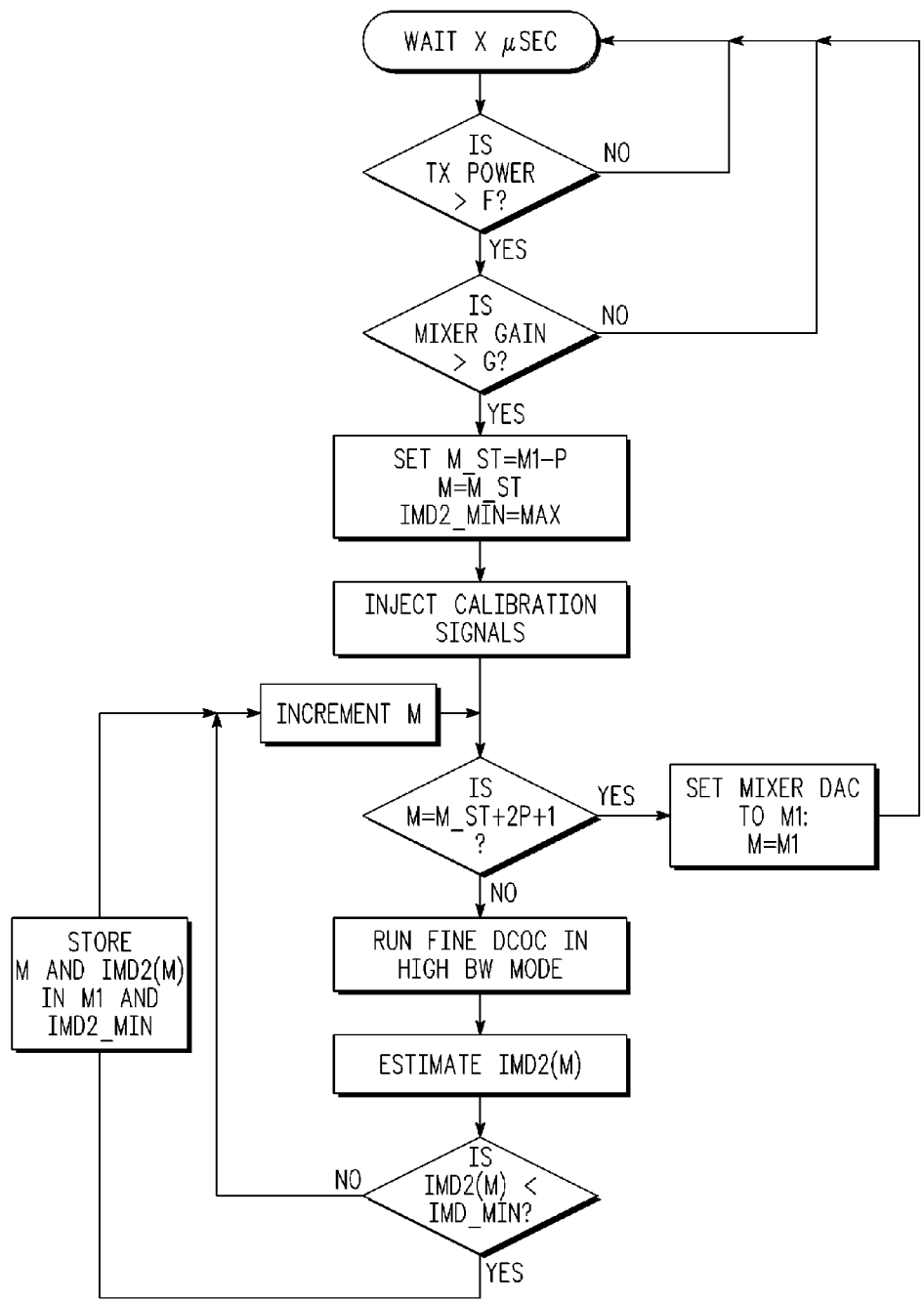
FIG. 17 is a flow diagram illustrating a method of tuning the IP2 during normal receive operation.

FIG. 17 is a flow diagram illustrating a method of tuning the IP2 during normal receive operation of the receiver 402, 1002, 1102 and 1402. Temperature variations can cause the IP2 of the mixer to change over time, and thus the IP2 tuning circuit is used to re-tune the IP2 during normal receive operation. Because the search shown in FIG. 16 could take too long, and because the performance of the receiver suffers during at least a portion of the tuning period, a subset method is used during normal receive operation. In FIG. 17, X is the time between each run of the algorithm, F is the transmit power, G is the receiver gain, N is the total number of DAC settings, where $N=2^{K-1}$, M is the present setting of the DAC, M1 is the internal optimal DAC setting, M_ST is the starting DAC setting for a neighbor search, P is the number of neighboring DAC settings to search on each side of the starting DAC setting. The subset method tries the DAC setting of 2P neighboring DAC settings in its search to update the maximum IP2. FIG. 17 shows how the DAC setting is updated using the subset method. At some periodic rate, X μsec, the subset method updates the DAC setting by searching 2P+1 DAC settings (the 2P neighboring DAC settings plus the present DAC setting), for a new minimum IMD2, i.e., maximum IP2. Because the graph of IP2 versus DAC setting appears to have a single maximum, it is expected that the P neighboring DAC settings also have reasonably good IP2, thus minimizing the impact on the receiver during this brief re-tuning. For example, if the value of P is set to "1", then, during each recalibration, the present DAC setting as well as one neighboring DAC setting on each side of the present setting are re-estimated. This results in three (3) IMD2 estimations, from which a lowest IMD2 is chosen. As another example, if the value of P is set to "2" and the present DAC setting is "31", then, during each recalibration, DAC setting "31" as well as DAC settings "29", "30", "32" and "33" are re-estimated. In other words, five (5) IMD2 estimations are made, from which a lowest IMD2 is chosen.

The re-tuning is only performed when the transmitted power and the gain of the mixer are above certain thresholds. This is done to minimize the impact on the sensitivity of the receiver. For example, if the mixer is not at maximum gain, the signal is likely a strong signal, e.g., above −70 dBm. At −70 dBm, there is sufficient signal-to-noise ratio (and signal-to-IMD2 ratio) to withstand a higher IMD2. Furthermore, as the gain of the mixer is decreased (such as when receiving a strong signal), the IP2 of the mixer increases. The values for F (the transmit power) and G (the receiver gain) depend upon the design of the transceiver 401, 1001, 1101 and 1401. For example, the values depend upon the amount of duplexer leakage, the minimum and maximum IP2 for the mixer, the noise in the transmit path, the required receiver sensitivity, and, possibly, the receiver selectivity. In an exemplary 3G WCDMA embodiment, the value of F is above approximately +15 dBm, and the value of G is any value below its maximum value of approximately 45 dB gain. In an exemplary embodiment using the first DSSS method that uses the squared version of the transceiver's own WCDMA signal as the calibration signal (FIG. 10), the value of X in FIG. 17 is 1-2 seconds. In an exemplary embodiment using the third DSSS method that uses the squared version of the specially-generated four-level PN DSSS signal as the calibration signal (FIG. 14), the value of X is much closer to zero, because the algorithm set forth in the flow diagram of FIG. 17 is running almost continuously.

Alternatively, the temperature of the receiver 402, 1002, 1102 and 1402 is monitored and re-tuning is performed only when the temperature changes. As another alternative, the value of X depends upon how much impact a change in temperature has on performance of the receiver. A predetermination is made as to how much the temperature would need to change before a significant degradation in performance would occur. Then, the temperature is monitored and re-tuning is performed only when the temperature changes by more than the predetermined amount. As a further alternative, re-tuning is performed less often if the temperature is within a predetermined number of degrees of an initial temperature, and more often if the temperature is beyond the predetermined number of degrees of the initial temperature. The method in accordance with the flow diagram of FIG. 17 can run continuously during normal receive operation. It should be noted that the step of "inject calibration signals" refers to one of the methods used during a cold start (such as a two-tone method); however, the step may also refer to one of the methods used during normal receive operation (such as the first DSSS method in which the transceiver's own WCDMA signal is always being injected when the transmitter transmits a normal signal).

Because the IMD2 is a function of gain of the mixer and the transmitted power, the power of the IMD2 is used to determine when a re-tuning should be performed. Alternatively, AGC narrow band received signal strength indication versus AGC wide band received signal strength indication is used to help determine when the re-tuning should be performed. Therefore, the re-tuning determination is a function of transmit power and the gain of the mixer. A fine DCOC algorithm is run for a brief period in high bandwidth mode during updates to the DAC settings of the mixer to ensure that any DC created as a result of changes made to the IP2 has minimal impact on the performance of the receiver. The re-tuning of the IP2 of the mixer during normal receive operation is performed with no impact to the transmitter. The IP2, noise, receive signal, transmit signal, and blockers have little impact on performance of the estimation circuit 452 and 453 because the squared version of the four-level PN is uncorrelated with all other signals.

In the event that the IP2 of the I-channel mixer 414 and its DAC setting are statistically independent from the IP2 of the Q-channel mixer 415 and its DAC setting, each DAC setting can be tuned independently via a one-dimensional search. With such one-dimensional search, the maximum IP2 for the I-channel mixer 414, which results in the minimum IMD2 for the I-channel, is selected independently from the selection of the maximum IP2 for the Q-channel mixer 415, which results in the minimum IMD2 for the Q-channel. A one-dimensional search is used when the optimal IP2 (and DAC setting) for the I-channel mixer 414 has no impact on the optimal IP2 (and DAC setting) for the Q-channel mixer 415.

In the event that the IP2 of the I-channel mixer 414 and its DAC setting are not statistically independent from the IP2 of the Q-channel mixer 415 and its DAC setting, each DAC setting cannot be tuned independently via a one-dimensional search. In such event, a two-dimensional search is used. With such two-dimensional search, the optimal IP2 for the I-channel mixer 414 and the optimal IP2 for the Q-channel mixer 415 are selected dependently upon each other. With such two-dimensional search, the DAC setting for the I-channel mixer 414 and the DAC setting for the Q-channel mixer 415 are simultaneously changed, and the DAC settings are evaluated as a pair for an optimal overall minimum IMD2. Such a two-dimensional search may result in compromise DAC settings for the mixers 414 and 415, which are not individually the optimal DAC settings, but provide the optimal overall minimum IMD2.

For example, if the mixers 414 and 415 are tuned independently, using a one-dimensional search, the IP2 for the I-channel might be tuned to a maximum value (gain) of 80 dBm, but this favorable maximum value on the I-channel might limit the IP2 for the Q-channel to an unfavorable maximum value of 40 dBm. In this example, the 40 dBm value is insufficient to meet the sensitivity requirement of the receiver 402. Other the other hand, by using a two-dimensional search, the IP2 for both the I-channel and the Q-channel might be tuned to a maximum value of 70 dBm. Although less than 80 dBm, the 70 dBm value for both the I-channel and the Q-channel is sufficient, in this example, to meet the sensitivity requirement of the receiver 402. Therefore, in cases similar to this example, when there is dependence, the two-dimensional search allows the optimal I-channel and Q-channel DAC settings to be selected.

In an empirical example using the third DSSS method, a 16,000 chip/codeword, four-level PN sequence was used and a correlation was performed on over one hundred (100) code words. In this example, the receive signal was at −25 dB, and the transmitter signal was at +25 dBm. At the output of the correlator 1442 and 1443, there was sufficient energy from the squared version of the four-level PN sequence to notice a positive SNR after approximately fifty (50) codewords, thereby detecting the calibration signal. Alternatively, to further improve the performance, a longer code word can be used and more chips can be integrated over. In this example, one hundred (100) code words=1,600,000 chips.

With the third DSSS method, the four-level PN sequence could also be used to estimate magnitude, phase imbalance, and bandwidth tracking on the biquad filters 418 and 419 without any need to account for signal fading or other non-idealities created by the channel. The processing gain is sufficient to receive the signal independent of blockers, as well. A difference in peaks between the I-channel correlator 1442 and the Q-channel correlator 1443 can be measured, and the difference can be used to re-align the data and/or rotate the phase of the constellation.

The IP2 calibration system comprises one of the circuits of FIGS. 4, 10, 11 and 14 used in conjunction with one of the methods described hereinabove for that circuit, and may also include one or both of the methods described in the flow diagrams of one of FIGS. 16 and 17.

It should be understood that all circuitry described herein may be implemented either in silicon or another semiconductor material or alternatively by software code representation of silicon or another semiconductor material.

Although the invention is described herein with reference to specific embodiments, various modifications and changes can be made without departing from the scope of the present invention as set forth in the claims below. For instance, although the exemplary embodiments show that the invention is used with a direct-conversion, 3G receiver that lacks both an LNA and a SAW filter, the invention is usable in a direct-conversion, 3G receiver that includes one of an LNA and a SAW filter, and the invention is also usable in any receiver. Although the exemplary embodiments show that the invention is used with WCDMA modulation, the invention is usable with other types of modulation. Although the exemplary embodiments show that the invention is used to tune the second order intercept point (IP2) to reduce second order intermodulation distortion (IMD2), the invention also applies to any higher order intercept point (IPn) and a corresponding higher order intermodulation distortion product (IMDn), where n is greater than 2.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A circuit for tuning a second order intercept point (IP2) of a mixer to minimize second order intermodulation distortion (IMD2) in a receiver of a transceiver, comprising:
   means for generating a normally-transmitted two-level PN DSSS signal;
   means for producing a specially-generated four-level PN DSSS signal whose squared version thereof has a low correlation with the normally-transmitted two-level PN DSSS signal;
   means for squaring the specially-generated four-level PN DSSS signal;
   means for transmitting the specially-generated four-level PN DSSS signal;
   means for attenuating the transmitted signal;
   means for receiving the attenuated transmitted signal;
   means for causing IMD2 to occur as a result of receiving the received attenuated transmitted signal, thereby producing a two-level PN DSSS signal;
   means for correlating codewords of the two-level PN DSSS signal produced by the IMD2 with codewords of the squared version of the specially-generated four-level PN DSSS signal produced by the means for squaring;
   means for changing an operating parameter of the mixer to change an IP2 thereof;
   means for determining composite power in chips of each correlated codeword at a plurality of operating parameters; and
   means for determining the operating parameter of the mixer that produces a maximum composite power, thereby tuning the IP2 of a mixer to cause minimal IMD2 in the receiver.

2. The circuit of claim 1, including means for performing a coarse DC offset correction after any change in the operating parameter of the mixer.

3. The circuit of claim 1, including means for estimating timing of the two-level PN DSSS signal produced by the IMD2 with the timing of the squared version of the specially-generated four-level PN DSSS signal produced by the means for squaring.

4. The circuit of claim 1, including
means for summing the normally-transmitted two-level PN DSSS signal with the specially-generated four-level PN DSSS signal; and
means for transmitting the summed signal.

5. The circuit of claim 1, in which the means for changing an operating parameter of the mixer occurs upon occurrence of at least one of: a change in temperature of the receiver by more than a predetermined amount, a reduction in sensitivity of the receiver more than a predetermined amount, and an increase in a bit error rate of the receiver more than a predetermined amount.

6. The circuit of claim 1, in which the means for changing an operating parameter of the mixer comprises converting the maximum composite power to an analog signal and using the analog signal to introduce a DC offset in the mixer.

7. In a transceiver including a duplexer, a receiver, and a transmitter that transmits a normally-transmitted DSSS signal, the transmitter and the receiver coupled to the duplexer, a method of tuning a second order intercept point (IP2) of a mixer in the receiver, comprising:

generating, in the transmitter, a normally-transmitted DSSS signal that has a chip rate;
transmitting the normally-transmitted DSSS signal;
at the duplexer, leaking a signal transmitted by the transmitter into the receiver;
at the mixer, the leaked signal producing second-order intermodulation distortion (IMD2);
using the IMD2 for tuning an IP2 of the mixer;
generating, in the transmitter, a specially-generated DSSS signal in which the specially-generated DSSS signal is a four-level, pseudorandom noise (PN), DSSS signal that has another chip rate different from the chip rate of the normally-transmitted DSSS signal;
summing the normally-transmitted DSSS signal and the specially-generated, four-level, PN DSSS signal to form a summed signal; and
transmitting the summed signal.

8. The method of claim 7, in which the tuning of the IP2 occurs during receiver warm-up.

9. The method of claim 7, in which the tuning of the IP2 occurs during normal receive operation of the receiver.

10. The method of claim 7, in which the tuning of the IP2 occurs after a cold start of the receiver.

\* \* \* \* \*